(12) United States Patent
Shoemaker et al.

(10) Patent No.: US 7,714,859 B2
(45) Date of Patent: May 11, 2010

(54) OCCLUSION REDUCTION AND MAGNIFICATION FOR MULTIDIMENSIONAL DATA PRESENTATIONS

(76) Inventors: Garth B. D. Shoemaker, 603-930 Seymour Street, Vancouver, British Columbia (CA) V6B 1B4; David J. P. Baar, 3534 West 3$^{rd}$ Avenue, Vancouver, British Columbia (CA) V6R 1L7; Ali Solehdin, 4927 Chalet Place, North Vancouver, British Columbia (CA) V7R 4X4

( * ) Notice: Subject to any disclaimer, the term of this patent is extended or adjusted under 35 U.S.C. 154(b) by 232 days.

(21) Appl. No.: 11/214,886

(22) Filed: Aug. 31, 2005

(65) Prior Publication Data

US 2006/0050091 A1    Mar. 9, 2006

Related U.S. Application Data

(60) Provisional application No. 60/606,906, filed on Sep. 3, 2004.

(51) Int. Cl.
*G06T 1/00* (2006.01)
*G06T 15/00* (2006.01)
*G06T 15/10* (2006.01)
*G06T 15/20* (2006.01)
*G06F 17/00* (2006.01)

(52) U.S. Cl. .................. 345/427; 345/418; 345/419

(58) Field of Classification Search .............. 345/419, 345/420, 421, 422, 424, 427, 428, 619, 625, 345/628, 660, 661, 664, 666, 667, 668, 670, 345/671, 672, 682, 767, 418

See application file for complete search history.

(56) References Cited

U.S. PATENT DOCUMENTS 3,201,546 A     8/1965 Richardson (Continued)

FOREIGN PATENT DOCUMENTS

CA     2350342     11/2002

(Continued)

OTHER PUBLICATIONS

Cowperthwaite, David J., "Occlusion Resolution Operators for Three-Dimensional Detail-In-Context" (Burnaby, British Columbia: Simon Fraser University, 2000).

(Continued)

*Primary Examiner*—Xiao M Wu
*Assistant Examiner*—Aaron M Guertin

(57) ABSTRACT

A method in a computer system for generating a presentation of a region-of-interest in an original image for display on a display screen, the original image being a collection of polygons having polygons defined by three or more shared edges joined at vertex points, the method comprising: establishing a lens for the region-of-interest, the lens having a magnified focal region for the region-of-interest at least partially surrounded by a shoulder region across which the magnification decreases, the focal and shoulder regions having respective perimeters; subdividing polygons in the collection of polygons proximate to at least one of the perimeters, as projected with the polygons onto a base plane, by inserting one or more additional vertex points and additional edges into the polygons to be subdivided; and, applying the lens to the original image to produce the presentation by displacing the vertex points onto the lens and perspectively projecting the displacing onto a view plane in a direction aligned with a viewpoint for the region-of-interest.

30 Claims, 12 Drawing Sheets

U.S. PATENT DOCUMENTS

| | | | |
|---|---|---|---|
| 4,581,647 A | 4/1986 | Vye | |
| 4,630,110 A | 12/1986 | Cotton et al. | |
| 4,688,181 A | 8/1987 | Cottrell et al. | |
| 4,790,028 A | 12/1988 | Ramage | |
| 4,800,379 A | 1/1989 | Yeomans | |
| 4,885,702 A | 12/1989 | Ohba | |
| 4,888,713 A | 12/1989 | Falk | |
| 4,985,849 A | 1/1991 | Hideaki | |
| 4,992,866 A | 2/1991 | Morgan | |
| 5,048,077 A | 9/1991 | Wells et al. | |
| 5,175,808 A | 12/1992 | Sayre | |
| 5,185,599 A | 2/1993 | Doornink et al. | |
| 5,185,667 A | 2/1993 | Zimmermann | |
| 5,200,818 A | 4/1993 | Neta et al. | |
| 5,206,721 A | 4/1993 | Ashida et al. | |
| 5,227,771 A | 7/1993 | Kerr et al. | |
| 5,250,934 A | 10/1993 | Denber et al. | |
| 5,258,837 A | 11/1993 | Gormley | |
| 5,321,807 A | 6/1994 | Mumford | |
| 5,329,310 A | 7/1994 | Liljegren et al. | |
| 5,341,466 A | 8/1994 | Perlin et al. | |
| 5,416,900 A | 5/1995 | Blanchard et al. | |
| 5,432,895 A | 7/1995 | Myers | |
| 5,451,998 A | 9/1995 | Hamrick | |
| 5,459,488 A | 10/1995 | Geiser | |
| 5,473,740 A | 12/1995 | Kasson | |
| 5,521,634 A | 5/1996 | McGary | |
| 5,523,783 A | 6/1996 | Cho | |
| 5,528,289 A | 6/1996 | Cortjens et al. | |
| 5,539,534 A | 7/1996 | Hino et al. | |
| 5,581,670 A | 12/1996 | Bier et al. | |
| 5,583,977 A | 12/1996 | Seidl | |
| 5,588,098 A | 12/1996 | Chen et al. | |
| 5,594,859 A | 1/1997 | Palmer et al. | |
| 5,596,690 A | 1/1997 | Stone et al. | |
| 5,598,297 A | 1/1997 | Yamanaka et al. | |
| 5,610,653 A | 3/1997 | Abecassis | |
| 5,613,032 A | 3/1997 | Cruz et al. | |
| 5,638,523 A | 6/1997 | Mullet et al. | |
| 5,644,758 A | 7/1997 | Patrick | |
| 5,651,107 A | 7/1997 | Frank et al. | |
| 5,652,851 A | 7/1997 | Stone et al. | |
| 5,657,246 A | 8/1997 | Hogan et al. | |
| 5,670,984 A * | 9/1997 | Robertson et al. | 345/585 |
| 5,680,524 A | 10/1997 | Maples et al. | |
| 5,682,489 A | 10/1997 | Harrow et al. | |
| 5,689,287 A | 11/1997 | Mackinlay et al. | |
| 5,689,628 A | 11/1997 | Robertson | |
| 5,721,853 A | 2/1998 | Smith | |
| 5,729,673 A | 3/1998 | Cooper et al. | |
| 5,731,805 A | 3/1998 | Tognazzini et al. | |
| 5,742,272 A | 4/1998 | Kitamura et al. | |
| 5,745,166 A | 4/1998 | Rhodes et al. | |
| 5,751,289 A | 5/1998 | Myers | |
| 5,754,348 A | 5/1998 | Soohoo | |
| 5,764,139 A | 6/1998 | Nojima et al. | |
| 5,786,814 A | 7/1998 | Moran et al. | |
| 5,798,752 A | 8/1998 | Buxton et al. | |
| 5,808,670 A | 9/1998 | Oyashiki et al. | |
| 5,812,111 A | 9/1998 | Fuji et al. | |
| 5,818,455 A | 10/1998 | Stone et al. | |
| 5,848,231 A | 12/1998 | Teitelbaum et al. | |
| 5,852,440 A | 12/1998 | Grossman et al. | |
| 5,872,922 A | 2/1999 | Hogan et al. | |
| 5,909,219 A | 6/1999 | Dye | |
| 5,923,364 A | 7/1999 | Rhodes et al. | |
| 5,926,209 A | 7/1999 | Glatt | |
| 5,949,430 A | 9/1999 | Robertson et al. | |
| 5,950,216 A | 9/1999 | Amro et al. | |
| 5,969,706 A | 10/1999 | Tanimoto et al. | |
| 5,973,694 A | 10/1999 | Steele et al. | |
| 5,991,877 A | 11/1999 | Luckenbaugh | |
| 5,999,879 A | 12/1999 | Yano | |
| 6,005,611 A | 12/1999 | Gullichsen et al. | |
| 6,037,939 A | 3/2000 | Kashiwagi et al. | |
| 6,052,110 A | 4/2000 | Sciammarella et al. | |
| 6,057,844 A | 5/2000 | Strauss | |
| 6,064,401 A | 5/2000 | Holzman et al. | |
| 6,067,372 A | 5/2000 | Gur et al. | |
| 6,073,036 A | 6/2000 | Heikkinen et al. | |
| 6,075,531 A | 6/2000 | DeStefano | |
| 6,081,277 A | 6/2000 | Kojima | |
| 6,084,598 A | 7/2000 | Chekerylla | |
| 6,091,771 A | 7/2000 | Seeley et al. | |
| 6,108,005 A | 8/2000 | Starks et al. | |
| 6,128,024 A | 10/2000 | Carver et al. | |
| 6,133,914 A | 10/2000 | Rogers et al. | |
| 6,154,840 A | 11/2000 | Pebley et al. | |
| 6,160,553 A | 12/2000 | Robertson et al. | |
| 6,184,859 B1 | 2/2001 | Kojima | |
| 6,198,484 B1 | 3/2001 | Kameyama | |
| 6,201,546 B1 | 3/2001 | Bodor et al. | |
| 6,201,548 B1 | 3/2001 | Cariffe et al. | |
| 6,204,845 B1 | 3/2001 | Bates et al. | |
| 6,204,850 B1 | 3/2001 | Green | |
| 6,215,491 B1 | 4/2001 | Gould | |
| 6,219,052 B1 | 4/2001 | Gould | |
| 6,241,609 B1 | 6/2001 | Rutgers | |
| 6,246,411 B1 | 6/2001 | Strauss | |
| 6,249,281 B1 | 6/2001 | Chen et al. | |
| 6,256,043 B1 | 7/2001 | Aho et al. | |
| 6,256,115 B1 | 7/2001 | Adler et al. | |
| 6,256,737 B1 | 7/2001 | Bianco et al. | |
| 6,266,082 B1 | 7/2001 | Yonezawa et al. | |
| 6,271,854 B1 | 8/2001 | Light | |
| 6,278,443 B1 | 8/2001 | Amro et al. | |
| 6,278,450 B1 | 8/2001 | Arcuri et al. | |
| 6,288,702 B1 | 9/2001 | Tachibana et al. | |
| 6,304,271 B1 | 10/2001 | Nehme | |
| 6,307,612 B1 | 10/2001 | Smith et al. | |
| 6,320,599 B1 | 11/2001 | Sciammarella et al. | |
| 6,337,709 B1 | 1/2002 | Yamaashi et al. | |
| 6,346,938 B1 | 2/2002 | Chan et al. | |
| 6,346,962 B1 | 2/2002 | Goodridge | |
| 6,359,615 B1 | 3/2002 | Singh | |
| 6,381,583 B1 | 4/2002 | Kenney | |
| 6,384,849 B1 | 5/2002 | Morcos et al. | |
| 6,396,648 B1 | 5/2002 | Yamamoto et al. | |
| 6,396,962 B1 | 5/2002 | Haffey et al. | |
| 6,400,848 B1 | 6/2002 | Gallagher | |
| 6,407,747 B1 | 6/2002 | Chui et al. | |
| 6,411,274 B2 | 6/2002 | Watanabe et al. | |
| 6,416,186 B1 | 7/2002 | Nakamura | |
| 6,417,867 B1 | 7/2002 | Hallberg | |
| 6,438,576 B1 | 8/2002 | Huang et al. | |
| 6,487,497 B2 | 11/2002 | Khavakh et al. | |
| 6,491,585 B1 | 12/2002 | Miyamoto et al. | |
| 6,504,535 B1 | 1/2003 | Edmark | |
| 6,515,678 B1 | 2/2003 | Boger | |
| 6,522,341 B1 | 2/2003 | Nagata | |
| 6,542,191 B1 | 4/2003 | Yonezawa | |
| 6,552,737 B1 | 4/2003 | Tanaka et al. | |
| 6,559,813 B1 | 5/2003 | DeLuca et al. | |
| 6,577,311 B1 | 6/2003 | Crosby et al. | |
| 6,577,319 B1 | 6/2003 | Kashiwagi et al. | |
| 6,584,237 B1 | 6/2003 | Abe | |
| 6,590,568 B1 | 7/2003 | Astala et al. | |
| 6,590,583 B2 | 7/2003 | Soohoo | |
| 6,608,631 B1 | 8/2003 | Milliron | |
| 6,612,930 B2 | 9/2003 | Kawagoe et al. | |
| 6,631,205 B1 | 10/2003 | Melen et al. | |
| 6,633,305 B1 | 10/2003 | Sarfeld | |
| 6,690,387 B2 | 2/2004 | Zimmerman et al. | |
| 6,720,971 B1 | 4/2004 | Yamamoto et al. | |

| Patent No. | Date | Inventor | Ref |
|---|---|---|---|
| 6,727,910 B2 | 4/2004 | Tigges | |
| 6,731,315 B1 | 5/2004 | Ma et al. | |
| 6,744,430 B1 | 6/2004 | Shimizu | |
| 6,747,610 B1 | 6/2004 | Taima et al. | |
| 6,747,611 B1 | 6/2004 | Budd et al. | |
| 6,760,020 B1 | 7/2004 | Uchiyama et al. | |
| 6,768,497 B2 * | 7/2004 | Baar et al. | 345/661 |
| 6,798,412 B2 * | 9/2004 | Cowperthwaite | 345/428 |
| 6,833,843 B2 | 12/2004 | Mojaver et al. | |
| 6,842,175 B1 | 1/2005 | Schmalstieg et al. | |
| 6,874,126 B1 | 3/2005 | Lapidous | |
| 6,882,755 B2 | 4/2005 | Silverstein et al. | |
| 6,906,643 B2 | 6/2005 | Samadani et al. | |
| 6,911,975 B2 | 6/2005 | Iizuka et al. | |
| 6,919,921 B1 | 7/2005 | Morota et al. | |
| 6,924,822 B2 | 8/2005 | Card et al. | |
| 6,938,218 B1 * | 8/2005 | Rosen | 715/850 |
| 6,956,590 B1 | 10/2005 | Barton et al. | |
| 6,961,071 B2 | 11/2005 | Montagnese et al. | |
| 6,975,335 B2 * | 12/2005 | Watanabe | 345/660 |
| 6,985,865 B1 | 1/2006 | Packingham et al. | |
| 7,038,680 B2 | 5/2006 | Pitkow | |
| 7,055,095 B1 | 5/2006 | Anwar | |
| 7,071,971 B2 | 7/2006 | Elberbaum | |
| 7,084,886 B2 | 8/2006 | Jetha et al. | |
| 7,088,364 B2 | 8/2006 | Lantin | |
| 7,106,349 B2 | 9/2006 | Baar et al. | |
| 7,133,054 B2 | 11/2006 | Aguera y Arcas | |
| 7,134,092 B2 * | 11/2006 | Fung et al. | 715/779 |
| 7,158,878 B2 | 1/2007 | Rasmussen | |
| 7,173,633 B2 | 2/2007 | Tigges | |
| 7,173,636 B2 | 2/2007 | Montagnese | |
| 7,197,719 B2 | 3/2007 | Doyle et al. | |
| 7,213,214 B2 | 5/2007 | Baar et al | |
| 7,233,942 B2 | 6/2007 | Nye | |
| 7,246,109 B1 | 7/2007 | Ramaswamy | |
| 7,256,801 B2 | 8/2007 | Baar et al. | |
| 7,274,381 B2 | 9/2007 | Mojaver et al. | |
| 7,275,219 B2 | 9/2007 | Shoemaker | |
| 7,280,105 B2 * | 10/2007 | Cowperthwaite | 345/419 |
| 7,283,141 B2 | 10/2007 | Baar et al. | |
| 7,310,619 B2 | 12/2007 | Baar et al. | |
| 7,312,806 B2 | 12/2007 | Tigges | |
| 7,321,824 B1 | 1/2008 | Nesbitt | |
| 7,411,610 B2 | 8/2008 | Doyle | |
| 7,423,660 B2 | 9/2008 | Ouchi et al. | |
| 7,450,114 B2 | 11/2008 | Anwar | |
| 7,472,354 B2 | 12/2008 | Jetha et al. | |
| 7,486,302 B2 | 2/2009 | Shoemaker | |
| 7,489,321 B2 | 2/2009 | Jetha et al. | |
| 7,495,678 B2 | 2/2009 | Doyle et al. | |
| 7,580,036 B2 | 8/2009 | Montagnese et al. | |
| 7,667,699 B2 | 2/2010 | Komar | |
| 2001/0040585 A1 | 11/2001 | Hartford et al. | |
| 2001/0040636 A1 | 11/2001 | Kato et al. | |
| 2001/0048447 A1 | 12/2001 | Jogo | |
| 2001/0055030 A1 | 12/2001 | Han | |
| 2002/0033837 A1 | 3/2002 | Munro | |
| 2002/0038257 A1 | 3/2002 | Joseph et al. | |
| 2002/0044154 A1 | 4/2002 | Baar et al. | |
| 2002/0062245 A1 | 5/2002 | Niu et al. | |
| 2002/0075280 A1 | 6/2002 | Tigges | |
| 2002/0087894 A1 | 7/2002 | Foley et al. | |
| 2002/0089520 A1 | 7/2002 | Baar | |
| 2002/0093567 A1 | 7/2002 | Cromer et al. | |
| 2002/0101396 A1 | 8/2002 | Huston et al. | |
| 2002/0122038 A1 * | 9/2002 | Cowperthwaite | 345/428 |
| 2002/0135601 A1 | 9/2002 | Watanabe et al. | |
| 2002/0143826 A1 | 10/2002 | Day et al. | |
| 2002/0171644 A1 * | 11/2002 | Reshetov et al. | 345/420 |
| 2002/0180801 A1 | 12/2002 | Doyle | |
| 2003/0006995 A1 | 1/2003 | Smith et al. | |
| 2003/0007006 A1 * | 1/2003 | Baar et al. | 345/767 |
| 2003/0048447 A1 | 3/2003 | Harju et al. | |
| 2003/0052896 A1 | 3/2003 | Higgins et al. | |
| 2003/0061211 A1 | 3/2003 | Shultz et al. | |
| 2003/0100326 A1 | 5/2003 | Grube et al. | |
| 2003/0105795 A1 | 6/2003 | Anderson et al. | |
| 2003/0112503 A1 | 6/2003 | Lantin | |
| 2003/0118223 A1 | 6/2003 | Rahn et al. | |
| 2003/0137525 A1 | 7/2003 | Smith | |
| 2003/0151625 A1 | 8/2003 | Shoemaker | |
| 2003/0151626 A1 | 8/2003 | Komar et al. | |
| 2003/0174146 A1 | 9/2003 | Kenoyer | |
| 2003/0179198 A1 | 9/2003 | Uchiyama | |
| 2003/0179219 A1 | 9/2003 | Nakano et al. | |
| 2003/0179237 A1 | 9/2003 | Nelson et al. | |
| 2003/0196114 A1 | 10/2003 | Brew et al. | |
| 2003/0210281 A1 | 11/2003 | Ellis et al. | |
| 2003/0227556 A1 | 12/2003 | Doyle | |
| 2003/0231177 A1 | 12/2003 | Montagnese et al. | |
| 2004/0056869 A1 | 3/2004 | Jetha et al. | |
| 2004/0056898 A1 | 3/2004 | Jetha et al. | |
| 2004/0111332 A1 | 6/2004 | Baar et al. | |
| 2004/0125138 A1 | 7/2004 | Jetha et al. | |
| 2004/0150664 A1 | 8/2004 | Baudisch | |
| 2004/0194014 A1 | 9/2004 | Anwar | |
| 2004/0217979 A1 | 11/2004 | Baar et al. | |
| 2004/0240709 A1 | 12/2004 | Shoemaker | |
| 2004/0257375 A1 * | 12/2004 | Cowperthwaite | 345/582 |
| 2004/0257380 A1 | 12/2004 | Herbert et al. | |
| 2005/0041046 A1 | 2/2005 | Baar et al. | |
| 2005/0134610 A1 | 6/2005 | Doyle et al. | |
| 2005/0259118 A1 | 11/2005 | Mojaver et al. | |
| 2005/0278378 A1 | 12/2005 | Frank | |
| 2005/0285861 A1 | 12/2005 | Fraser | |
| 2006/0022955 A1 | 2/2006 | Kennedy | |
| 2006/0026521 A1 | 2/2006 | Hotelling et al. | |
| 2006/0033762 A1 | 2/2006 | Card et al. | |
| 2006/0036629 A1 | 2/2006 | Gray | |
| 2006/0082901 A1 | 4/2006 | Shoemaker | |
| 2006/0098028 A1 * | 5/2006 | Baar | 345/619 |
| 2006/0139375 A1 | 6/2006 | Rasmussen et al. | |
| 2006/0192780 A1 | 8/2006 | Lantin | |
| 2006/0214951 A1 | 9/2006 | Baar et al. | |
| 2007/0033543 A1 | 2/2007 | Ngari et al. | |
| 2007/0064018 A1 | 3/2007 | Shoemaker et al. | |
| 2007/0097109 A1 | 5/2007 | Shoemaker et al. | |
| 2009/0141044 A1 | 6/2009 | Shoemaker | |
| 2009/0147023 A1 | 6/2009 | Jetha et al. | |
| 2009/0172587 A1 | 7/2009 | Carlisle | |
| 2009/0265656 A1 | 10/2009 | Jetha | |
| 2009/0284542 A1 | 11/2009 | Baar | |
| 2010/0026718 A1 | 2/2010 | Jetha | |
| 2010/0033503 A1 | 2/2010 | Baar | |

FOREIGN PATENT DOCUMENTS

| | | |
|---|---|---|
| CA | 2386560 | 11/2003 |
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |

OTHER PUBLICATIONS

Carpendale, Marianne S.T., "A Framework for Elastic Presentation Space" (Burnaby, British Columbia: Simon Fraser University, 1999).

Robertson, et al., ""The Document Lens"", (1993),pp. 101-108.

Carpendale, Marianne Sheelagh T., ""A Framework for Elastic Presentation Space"", *Simon Fraser University*, Burnaby; British Columbia XP001051168: cited in the application figures 2.13, 3.1-3.31, 4.1-4.19, 5.14,(1999),pp. 7, 14, 34, 38, 65, 112, 123, and 126.

"Non Final OA", U.S. Appl. No. 11/935,222, (Feb. 20, 2009),12 pages.

Carpendale, M.S.T et al., "'A Framework for Unifying Presentation Space'", *01UIST. Proceedings of the 14th Annual ACM Symposium on User Interface Software and Technology, Proceedings of UIST '01: ACM Symposium on User Interface Software and Technology*, Orlando, FL, USA; XP002249323 2001, New York, NY, USA, ISBN: 1-58113-438-X,(Nov. 14, 2001),pp. 61-70; p. 64.

Ikedo, T "'A Realtime Video-Image Mapping User Polygon Rendering Techniques'", *IEEE Intl. conf on Ottawa*, ONT, Canada Jun. 3-6, 1997, Los Alamitos, CA, USA; *IEEE Comput. Soc*, US, XP010239181, ISBN: 0-8186-7819-4 Sections 2, 4.4; Multimedia Computing and Systems '97 Proceedings,(Jun. 3, 1997),pp. 127-134.

Bouju, A. et al., "'Client-Server Architecture for Accessing Multimedia and Geographic Databases within Embedded Systems'", *Database and Expert Systems Applications, 1999 Proceedings. Tenth International Workshop on Florence*, Italy Sep. 1-3, 1999, Los Alamitos, CA, USA, *IEEE Comput. Soc*, US, XP010352370; ISBN:0-7695-0281-4, abstract, figure 2,(Sep. 1-3, 1999),pp. 760-764.

Robertson, G et al., "The Document Lens", *UIST. Proceedings of the Annual ACM Symposium on User Interface Software and Technology*. abstract figures 3,4,(Nov. 3, 1993),pp. 101-108.

Dursteler, Juan C., "The digital magazine of InfoVis.net", Retrieved from: http://www.infovis.net/printMag.php?num=85&lang=2; (Apr. 22, 2002).

"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).

Kuederle, Oliver "'Presentation of Image Sequences: A Detail-In-Context Approach'", *Thesis, Simon Fraser University*; (Aug. 2000),pp. 1-3, 5-10, 29-31.

Microsoft Corp., "Microsoft Paint", Microsoft Corp.,(1981-1998),Paint 1-14.

"Electronic Magnifying Glasses", *IBM Technical Disclosure Bulletin, IBM Corp.*, New York, US, vol. 37, No. 3; XP000441501, ISSN: 0018-8689 the whole document; (Mar. 1, 1994),pp. 353-354.

Keahey, T. A., "'The Generalized Detail-In-Context Problem'", *Information Visualization 1998, Proceedings; IEEE Symposium On Research Triangle*, CA, USA; Los Alamitos, CA, USA, *IEEE Comput. Soc*, US; XP010313304; ISBN: 0-8186-9093,(Oct. 19-20, 1998),pp. 44-51, 152.

Carpendale, et al., "'3-Dimensional Pliable Surfaces: For the Effective Presentation of Visual Information'", *Proceedings of the 8th annual ACM symposium on User interface and software technology*; (Dec. 1995).

Carpendale, M S T et al., "'Extending distortion viewing from 2D to 3D'", *IEEE Computer Graphics and Applications, IEEE Inc.* New York, US, vol. 17, No. 4; XP000927815, ISSN: 0272-1716. (Jul. 1997),pp. 42-51.

Viega, J et al., "'3D magic lenses'", *Proceedings of the 9th annual ACM symposium on User interface software and technology*; Pub 1996 ACM Press New York, NY, USA; (1996),51-58.

Carpendale, M.S.T. et al., "'Exploring Distinct Aspects of the Distortion Viewing Paradigm'", *Technical Report TR 97-08, School of Computer Science*, Simon Fraser University, Burnaby, British Columbia, Canada; (Sep. 1997).

Cowperthwaite, David J., et al., "'Visual Access For 3D Data'", *in Proceedings of ACM CHI 96 Conference on Human Factors in Computer Systems, vol. 2 of Short Papers: Alternative Methods of Interaction*; (1996),pp. 175-176.

Keahey, T. A., "'Visualization of High-Dimensional Clusters Using NonLinear Magnification'", *Technical Report LA-UR-98/2776, Los Alamos National Laboratory*; (1998).

Tigges, M. et al., "'Generalized Distance Metrics For Implicit Surface Modeling'", *Proceedings of the Tenth Western Computer Graphics Symposium*;(Mar. 1999).

Bossen, F. J., "'Anisotropic Mesh Generation With Particles'", *Technical Report CMU-CS-96-134, CS Dept, Carnegie Mellon University*; (May 1996).

Bossen, F. J., et al., "'A Pliant Method For Anisotropic Mesh Generation'", *5th Intl. Meshing Roundtable*; (Oct. 1996),pp. 63-74.

Wilson, et al., "'Direct Volume Rendering Via 3D Textures'", *Technical Report UCSC-CRL-94-19*, University of California, Santa Cruz, *Jack Baskin School of Engineering*; (Jun. 1994).

Carpendale, M.S.T. "A Framework for Elastic Presentation Space", *PhD thesis, Simon Fraser University*; (1999),pp. 69, 72, 78-83,98-100, 240, and 241.

Keahey, T. A., et al., "'Techniques For Non-Linear Magnification Transformations'", *Information Visualization '96, Proceedings IEEE Symposium on*, San Francisco, CA, Los Alamitos, CA, USA, *IEEE Comput. Soc*, US: XP010201943; ISBN: 0-8186-7668-X the whole document,(Oct. 28, 1996),pp. 38-45.

Carpendale, M. Sheelagh T., et al., "'3-Dimensional Pliable Surfaces: For the Effective Presentation of Visual Information'", *UIST '95, 8th Annual Symposium On User Interface Software and Technology, Proceedings Of The ACM Symposium On User Interface Software and Technology, Pittsburgh, PA, ACM Symposium On User Interface Technology*, New York, Nov. 14, 1995 (1995-, (Nov. 14-17, 1995),pp. 217-226.

Tominski, Christian et al., "'Fisheye Tree Views and Lenses for Graph Visualization'", pp. 1-8.

Keahey, T. A., "'Getting Along: Composition of Visualization Paradigms'", *Visual Insights, Inc.*; (2001).

Sakamoto, Chikara et al., "' Design and Implementation of a Parallel Pthread Library (PPL) with Parallelism and Portability'", *Systems and Computers in Japan*, New York, US, vol. 29, No. 2; XP000752780, ISSN: 0882-1666 abstract,(Feb. 1, 1998),pp.28-35.

Deng, K. et al., "'Texture Mapping with a Jacobian-Based Spatially-Variant Filter",", *Proceedings 10th Pacific Conference on Computer Graphics and Applications*, Beijing, China, 2002 Los Alamitos, CA, USA, *IEEE Comput. Soc*, USA; XP00224932, ISBN; 0-7695-1784-6 the whole document,(Oct. 9-11, 2002),pp. 460-461.

Welsh, Michelle "Futurewave Software", *Business Wire*; (Nov. 15, 1993).

Lamar, et al., "A Magnification Lens for Interactive Volume Visualization", *Acm*; pp. 1-10.

Fitzmaurice, G. et al., "'Tracking Menus'", *UIST*; (2003),pp. 71-79.

Stone, et al., "The movable filter as a user interface tool", *Proceedings of CHI ACM*; (1992),pp. 306-312.

Baudisch, P. et al., "'Halo: a Technique For Visualizing Off-Screen Locations'", *CHI*; (Apr. 5-10, 2003).

Baudisch, P. et al., "'Drag-And-Pop: Techniques for Accessing Remote Screen Content on Touch-And-Pen-Operated Systems'", *Interact '03*, (2003).

Carpendale, M.S.T. et al., "'Making Distortions Comprehensible'", *Visual Languages, Proceedings, 1997 IEEE Symposium On Isle of Capri*, Italy, Sep. 23-26, 1997, Los Alamitos, CA, USA, *IEEE Comput. Soc.*, US, Sep. 23, 1997; XP010250566, ISBN: 0-8186-8144-6,(Sep. 23-26, 1997),pp. 36-45.

Ito, Minoru et al., "'A Three-Level Checkerboard Pattern (TCP) Projection Method for Curved Surface Measurement'", *Pattern Recognition, Pergamon Press Inc.*, Elmsford, N.Y., US vol. 28, No. 1; XP004014030, ISSN 0031-3203,(1995),pp. 27-40.

Keahey, T A., et al., "'Nonlinear Magnification Fields'", *Information Visualization, 1997, Proceedings, IEEE Symposium On Phoenix*, AZ, USA, Los Alamitos, CA, USA, *IEEE Comput. Soc.*, US; XP010257169; ISBN: 0-8186-8189-6,(Oct. 20-21, 1997),pp. 51-58 and 121.

Rauschenbach, U. "'The Rectangular Fish Eye View as an Efficient Method for the Transmission and Display of Large Images'", *Image Processing, ICIP 99, Proceedings, 1999 International Conference On*, Kobe, Japan, Oct. 24-28, 1999, Piscataway, NJ, USA, IEEE, US, XP010368852, ISBN 0-7803-5467-2 p. 115, left-handed column—p. 116, paragraph 3, p. 118, paragraph 7.1; (1999),pp. 115-119.

Keahey, T. A., "Nonlinear Magnification", (*Indiana University Computer Science*), (1997).

Watt, et al., "Advanced Animation and Rendering Techniques", (*Addison-Wesley Publishing*), (1992), p. 106-108.

Boots, B. N., "Delauney Triangles: An Alternative Approach to Point Pattern Analysis", *Proc. Assoc. Am. Geogr. 6*, (1974),p. 26-29.

Sheelagh, M. et al., ""Distortion Viewing Techniques for 3-Dimensional Data"", *Information Visualization '96, Proceedings IEEE Symposium on San Francisco*, CA, USA, Los Alamitos, CA, USA, *IEEE Comput. Soc*, US Oct. 28, 1996; XP010201944; ISBN: 0-8186-7668-X,(Oct. 28-29, 1996),pp. 46-53, 119.

Leung, Y. K., et al., ""A Review and Taxonomy of Distortion-Oriented Presentation Techniques"", *ACM Transactions on Computer-Human Interaction*, 'Online! vol. 1, No. 2, XP002252314; Retrieved from the Internet: <URL:http://citeseer.nj.nec.com/ leung94review.html> 'retrieved on Aug. 21, 2003! the whole document,(Jun. 1994),pp. 126-160.

"Non Final Office Action", U.S. Appl. No. 10/358,394, (Mar. 13, 2009).

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, et al., "Graph Folding: Extending Detail and Context Viewing into a Tool for Subgraph Comparisons", *In Proceedings of Graph Drawing 1995*, Passau, Germany, (1995),pp. 127-139.

Carpendale, M.S.T. "A Framework for Elastic Presentation Space", http://pages.cpsc.ucalgary.ca/~sheelagh/personal/thesis/, (Nov. 19, 1999).

"Non Final Office Action", U.S. Appl. No. 11/542,120, (Jan. 22, 2009),20 pages.

"Non-Final Office Action", U.S. Appl. No. 11/410,024, (Mar. 11, 2009),35 pages.

"Foreign Office Action", Application No. 2002-536993, (Mar. 11, 2009),2 pages.

"Notice of Allowance", U.S. Appl. No. 11/401 349 (Apr. 17, 2009),35 pages.

Schmalstieg, Dieter et al., "Using transparent props for interaction with the virtual table", Proceedings of the 1999 symposium on Interactive 3D graphics.,(Apr. 26, 1999),8 pages.

"Final Office Action", U.S. Appl. No. 10/705,199, (May 12, 2009),46 pages.

"Non Final Office Action", U.S. Appl. No. 11/541,778, (Jun. 19, 2009),11 pages.

"Non Final Office Action", U.S. Appl. No. 11/673,038, (Jul. 13, 2009),30 pages.

"Non Final Office Action", U.S. Appl. No. 11/410,024, (Jul. 20, 2009),12 pages.

Smith, et al., "Efficient techniques for wide-angle stereo vision using surface projection models", Retrieved from <http://ieee.org/stamp.jsp?arnumber=17045, (1999),6 pages.

"Non Final Office Action", U.S. Appl. No. 11/159,205, (Jul. 27, 2009),13 pages.

"Advisory Action", U.S. Appl. No. 11/249,493, (Aug. 11, 2009),5 pages.

"Advisory Action", U.S. Appl. No. 10/705,199, (Aug. 18, 2009),5 pages.

"Restriction Requirement", U.S. Appl. No. 11/935,222, (Aug. 20, 2009),6 pages.

"Advisory Action", U.S. Appl. No. 11/249,493, (Sep. 14, 2009), 4 pages.

"Non-Final Office Action", U.S. Appl. No. 12/364,450, (Sep. 30, 2009), 10 pages.

"Notice of Allowance", U.S. Appl. No. 10/358,394, (Oct. 8, 2009), 7 pages.

"Final Office Action", U.S. Appl. No. 11/935,222, (Nov. 24, 2009), 8 pages.

"Final Office Action", U.S. Appl. No. 11/541,778, (Dec. 4, 2009), 12 pages.

"BPAI Decision", U.S. Appl. No. 10/682,298, (Dec. 30, 2009), 14 pages.

"Notice of Allowance", U.S. Appl. No. 11/410,024, (Jan. 4, 2010), 7 pages.

"Final Office Action", U.S. Appl. No. 11/673,038, (Jan. 8, 2010), 33 pages.

"Advisory Action", U.S. Appl. No. 11/541,778, (Feb. 1, 2010), 3 pages.

"Advisory Action", U.S. Appl. No. 11/935,222, (Feb. 4, 2010), 3 pages.

* cited by examiner

700

OCCLUSION REDUCTION AND MAGNIFICATION FOR MULTIDIMENSIONAL DATA PRESENTATIONS

This application claims priority from U.S. Provisional Patent Application No. 60/606,906, filed Sep. 3, 2004, and incorporated herein by reference.

FIELD OF THE INVENTION

This invention relates to the field of computer graphics processing, and more specifically, to a method and system for reducing occlusion and providing magnification in multidimensional data presentations.

BACKGROUND OF THE INVENTION

Multidimensional and three-dimensional ("3D") presentations of information present specific challenges not found in two-dimensional ("2D") presentations. For example, in 3D presentations certain elements may be occluded by the presence of other elements in the presentation. Traditional approaches to dealing with occlusion avoidance in 3D presentations include techniques such as cutting planes, viewer navigation, filtering of information, and transparency. While these methods provide clearer visual access to elements of interest, they remove much of the contextual information from a presentation.

In 2D presentations all information is restricted to a plane perpendicular to a view point. The addition of the third spatial variable (or z component) in 3D presentations allows objects to be interposed or positioned between the viewpoint and other objects in a scene, thus partially or completely hiding them from view. The preservation of spatial relationships and presentation of relationships to the occluding objects is important in constructing a physically plausible scene, or in other words, for maintaining the detail of the scene in the context in which it exists. For example, in volumetric rendering of 3D data it is often the case that the near-continuous nature of the data makes occlusion of interior features of the data inevitable. This phenomenon is important in supporting the perception of the scene as a 3D presentation, but a user may very well wish to examine these hidden interior features and regions.

Solutions are available that provide visual access (i.e., clear lines of sight) to previously occluded elements. Several of these solutions are described by Cowperthwaite (Cowperthwaite, David J., *Occlusion Resolution Operators for Three-Dimensional Detail-In-Context* (Burnaby, British Columbia: Simon Fraser University, 2000), which is incorporated herein by reference. Cutting planes may be used to remove information from a scene. Increasing transparency (or reducing the opacity) of objects allows more distant objects to be seen through those more proximal to the viewer. Navigation of the viewer, whether egocentric (moving the viewer within the data space) or exocentric (moving or re-orientation of the data space) may lead to a configuration where occlusion is resolved. Finally, information filtering may be used to reduce the density of data in a representation. These are all common methods of occlusion resolution and all operate by reducing the amount (or visibility) of contextual information in the final presentation. Similar methods such as panning zooming and filtering have also been traditionally applied to dealing with large or congested displays of information in 2D. Thus, the removal of information from a presentation has been one approach to dealing with occlusion in large information spaces.

Another approach has been the development of "detail-in-context" presentation algorithms. The field of detail-in-context viewing is concerned with the generation of classes of information presentations where areas or items defined as focal regions or regions-of-interest are presented with an increased level of detail, without the removal of contextual information from the original presentation. For example, regions of greatest interest may be displayed at an enlarged size, providing more visual detail, while the scale of the surrounding context may be adjusted to provide the space for the magnification of the region-of-interest.

Thus, in 3D computer graphics and 3D information presentations generally, occlusion of objects of interest by other objects in the viewer's line of sight is a common problem. U.S. Pat. No. 6,798,412, which is incorporated herein by reference, describes methods of occlusion reduction based on displacements orthogonal to the line of sight and based on a variety of distance metrics and shaping functions. What are now needed are additional methods and improvements to methods for occlusion reduction and magnification.

A need therefore exists for an improved method and system for reducing occlusion and providing magnification in multidimensional data presentations. Accordingly, a solution that addresses, at least in part, the above and other shortcomings is desired.

SUMMARY OF THE INVENTION

According to one aspect of the invention, there is provided a method in a computer system for generating a presentation of a region-of-interest in an original image for display on a display screen, the original image being a collection of polygons having polygons defined by three or more shared edges joined at vertex points, the method comprising: establishing a lens for the region-of-interest, the lens having a magnified focal region for the region-of-interest at least partially surrounded by a shoulder region across which the magnification decreases, the focal and shoulder regions having respective perimeters; subdividing polygons in the collection of polygons proximate to at least one of the perimeters, as projected with the polygons onto a base plane, by inserting one or more additional vertex points and additional edges into the polygons to be subdivided; and, applying the lens to the original image to produce the presentation by displacing the vertex points onto the lens and perspectively projecting the displacing onto a view plane in a direction aligned with a viewpoint for the region-of-interest.

According to another aspect of the invention, there is provided a method in a computer system for generating a presentation of an object-of-interest in an original image for display on a display screen, the original image being a collection of objects, the object-of-interest being one object in the collection, the method comprising: establishing a viewpoint for the object-of-interest; establishing a path through the original image between the viewpoint and the object-of-interest; extruding points on the object-of-interest along the path toward the viewpoint to define a volume for determining minimum displacements from the path for objects intersected by the volume; and, displacing one or more of the objects away from the path according to a transformation function and the minimum displacements to locations within the original image where substantially all of the objects displaced remain visible and do not occlude the object-of-interest when viewed from the viewpoint.

In accordance with further aspects of the present invention there is provided an apparatus such as a data processing system, a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
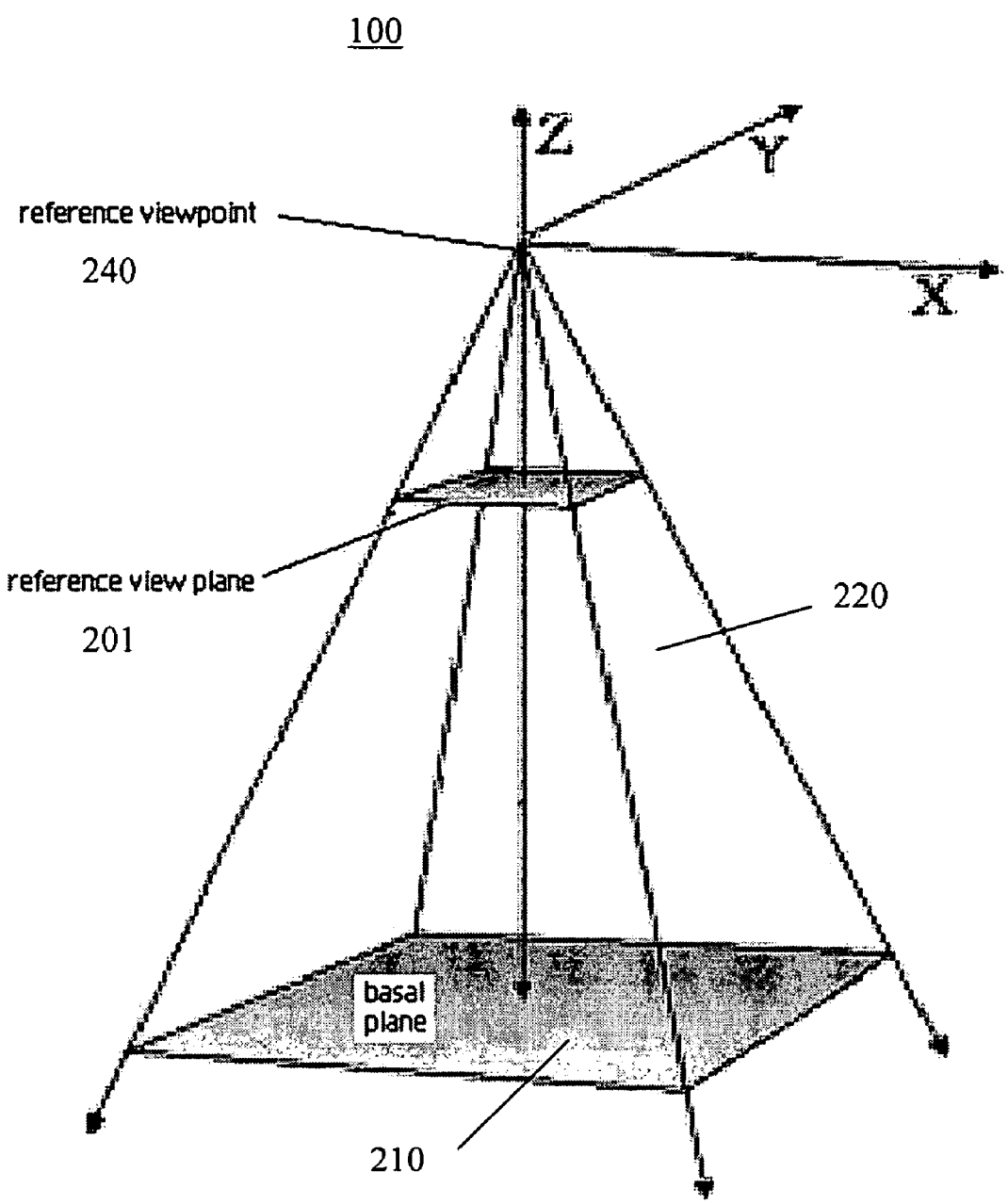
FIG. 1 is a graphical representation illustrating the geometry for constructing a three-dimensional perspective viewing frustum, relative to an x, y, z coordinate system, in accordance with elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the navigation systems, computer systems, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

The "screen real estate problem" generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation or image where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation illustrating the geometry 100 for constructing a three-dimensional ("3D") perspective viewing frustum 220, relative to an x, y, z coordinate system, in accordance with elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
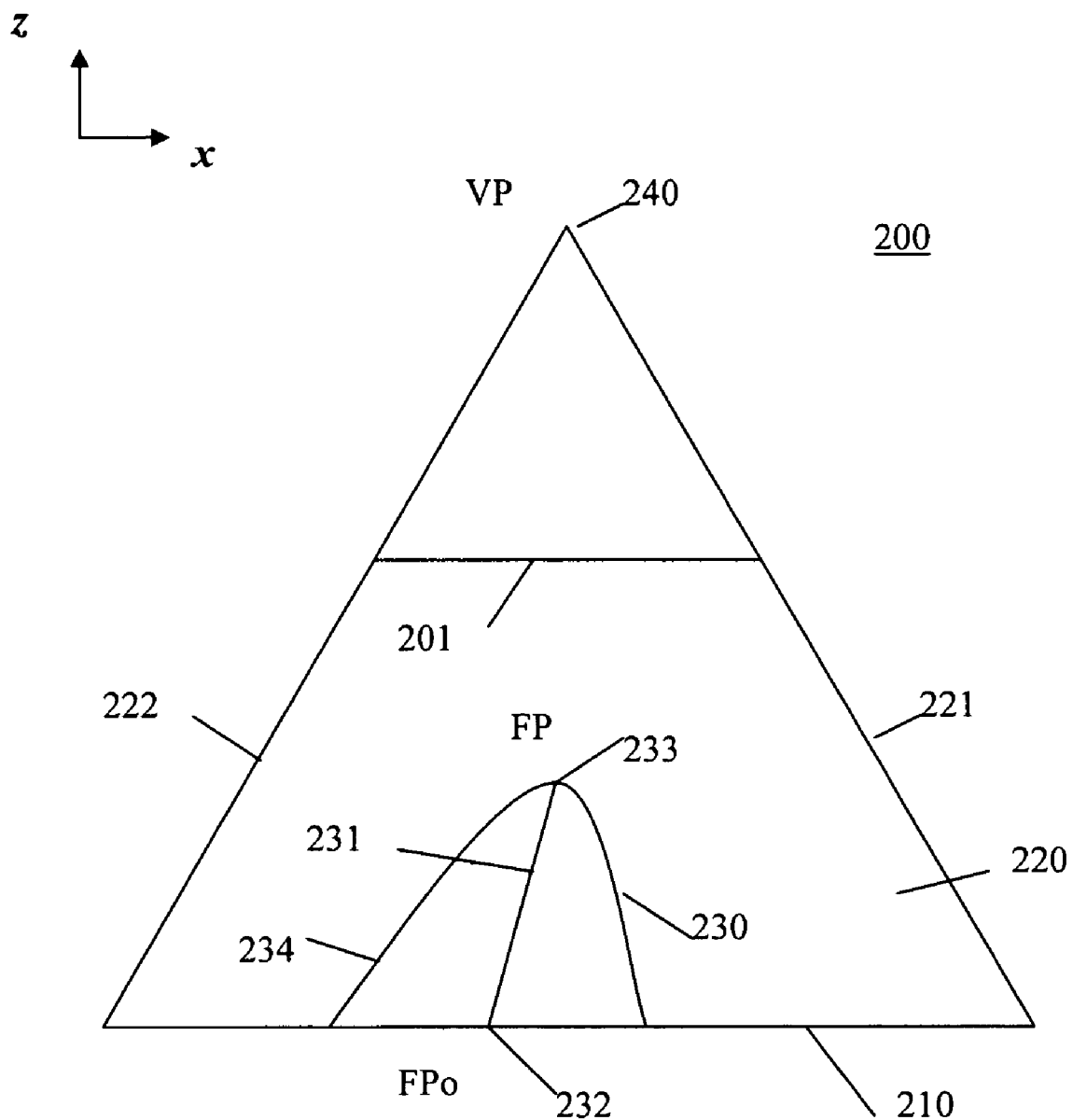
FIG. 2 is a graphical representation illustrating the geometry of a presentation in accordance with elastic presentation space graphics technology.

FIG. 2 is a graphical representation illustrating the geometry 200 of a presentation in accordance with EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230. Typically, the perspective projection has a direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
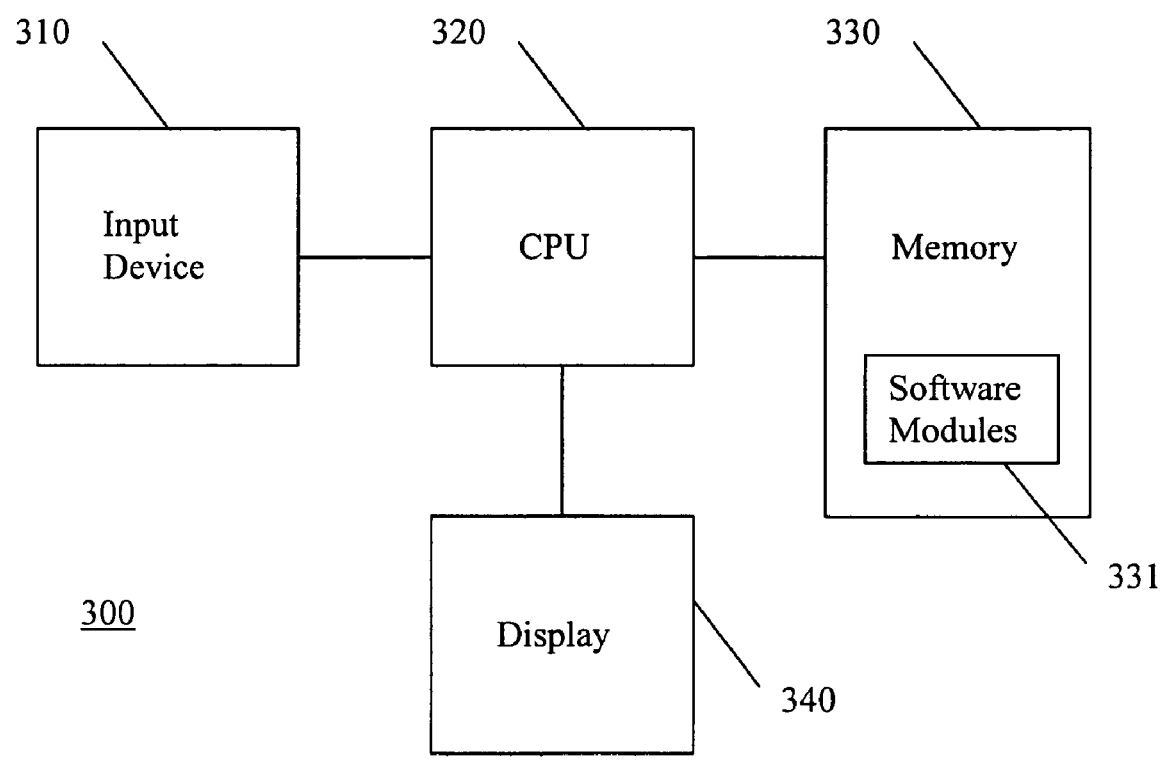
FIG. 3 is a block diagram illustrating a data processing system adapted to implement an embodiment of the invention.

FIG. 3 is a block diagram illustrating a data processing system 300 adapted to implement an embodiment of the invention. The data processing system 300 is suitable for implementing EPS technology, for displaying detail-in-context presentations of representations in conjunction with a detail-in-context graphical user interface ("GUI") 400, as described below, and for controlling detail-in-context lenses in detail-in-context presentations while reducing occlusion and improving magnification. The data processing system 300 includes an input device 310, a central processing unit ("CPU") 320, memory 330, and a display 340. The input device 310 may include a keyboard, a mouse, a trackball, an eye tracking device, a position tracking device, or a similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal-bearing medium that is uploaded to a network by a vendor or supplier of the programmed instructions, and this signal-bearing medium may be downloaded through an interface to the data processing system 300 from the network by end users or potential buyers.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the editing of multi-layer images and to the control of detail-in-context data presentations. The software can be loaded into and run by the data processing system 300 of FIG. 3. In general, applications in computer graphics systems are launched by the computer graphics system's operating system upon selection by a user from a menu or other GUI. A GUI is used to convey information to and receive commands from users and generally includes a variety of GUI objects or controls, including icons, toolbars, drop-down menus, text, dialog boxes, buttons, and the like. A user typically interacts with a GUI by using a pointing device (e.g., a mouse) to position a pointer or cursor over an object and "clicking" on the object.

Figure 4:
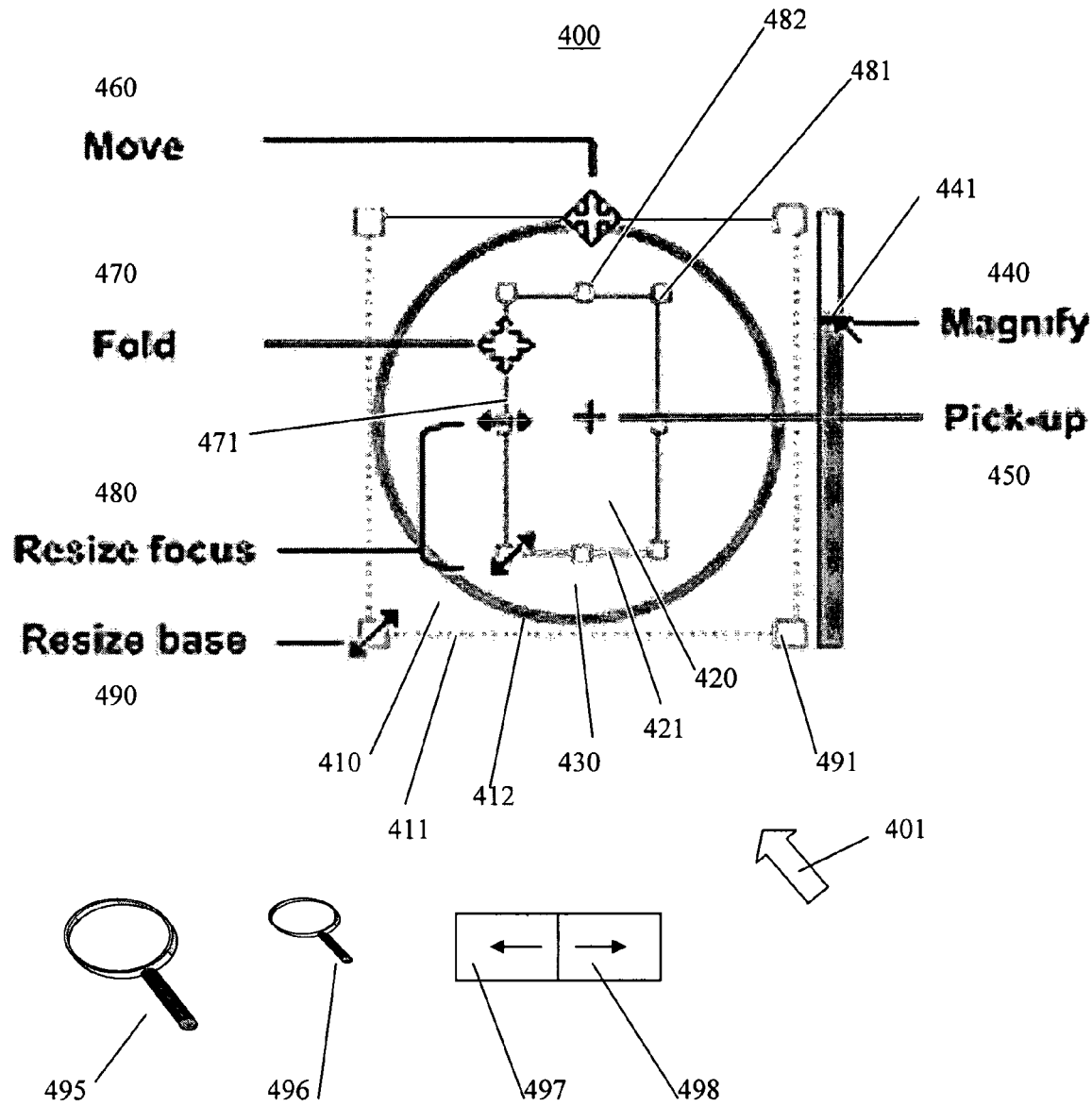
FIG. 4 is a partial screen capture illustrating a GUI having lens control elements for user interaction with detail-in-context data presentations.

FIG. 4 is a partial screen capture illustrating a GUI 400 having lens control elements for user interaction with detail-in-context data presentations. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e., dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g., a mouse) with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2D or 3D (or even greater numbers of dimensions) pointing devices including a trackball, a keyboard, an eye tracking device, and a position tracking device.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, zoom, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491 magnify slide bar icon 440, zoom icon 495, and scoop slide bar icon (not shown). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 440. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resizing of the base 412 (or outline) of a lens 410 is provided by the resize base lens control element of the GUI. After the lens 410 is selected, a bounding rectangle icon 411 is displayed surrounding the base 412. For a rectangular shaped base 412, the bounding rectangle icon 411 may be coextensive with the perimeter of the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles will change the proportions of the base 412. That is, the middle handles change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle may include arrows indicating width resizing or height resizing. After pointing at the desired handle 491 the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resizing of the focal region 420 of a lens 410 is provided by the resize focus lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom functionality is provided by the zoom lens control element of the GUI. Referring to FIG. 2, the zoom lens control element, for example, allows a user to quickly navigate to a region of interest 233 within a continuous view of a larger presentation 210 and then zoom in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom in" to the extent of the focal region such that the extent of the focal region fills the display screen 340 (i.e. "zoom to focal region extent"); (b) "zoom in" to the extent of the lens such that the extent of the lens fills the display screen 340 (i.e. "zoom to lens extent"); or, (c) "zoom in" to the area lying outside of the extent of the focal region such that the area without the focal region is magnified to the same level as the extent of the focal region (i.e. "zoom to scale").

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e. "zoom to focal region extent"), the user would point and click within the extent of the focal region. To zoom in to the extent of the lens such that the extent of the lens fills the display screen 340 (i.e. "zoom to lens extent"), the user would point and click within the extent of the lens. Or, to zoom in to the presentation area without the extent of the focal region, such that the area without the extent of the focal region is magnified to the same level as the extent of the focal region (i.e. "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

The concavity or "scoop" of the shoulder region 430 of the lens 410 is provided by the scoop lens control element of the GUI. After the lens 410 is selected, the scoop control is presented to the user as a slide bar icon (not shown) near or adjacent to the lens 410 and typically below the lens 410. Sliding the bar (not shown) of the slide bar results in a proportional change in the concavity or scoop of the shoulder region 430 of the lens 410. The slide bar not only informs the user that the shape of the shoulder region 430 of the lens 410 may be selected, but also provides the user with an indication as to what degree of shaping is possible. The slide bar includes a bar (not shown) that may be slid left and right, or up and down, to adjust and indicate the degree of scooping. To control the degree of scooping, the user would click on the bar of the slide bar and drag in the direction of desired scooping degree. Once the desired degree of scooping is reached, the user would release the mouse button 310. The lens 410 is then locked with the selected scoop until a further scooping operation is performed.

Advantageously, a user may choose to hide one or more lens control icons 450, 412, 411, 421, 481, 482, 491, 440, 495 shown in FIG. 4 from view so as not to impede the user's view of the image within the lens 410. This may be helpful, for example, during an editing or move operation. A user may select this option through means such as a menu, toolbar, or lens property dialog box.

In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

Thus, detail-in-context data viewing techniques allow a user to view multiple levels of detail or resolution on one display 340. The appearance of the data display or presentation is that of one or more virtual lenses showing detail 233 within the context of a larger area view 210. Using multiple lenses in detail-in-context data presentations may be used to compare two regions of interest at the same time. Folding enhances this comparison by allowing the user to pull the regions of interest closer together. Moreover, using detail-in-context technology such as PDT, an area of interest can be magnified to pixel level resolution, or to any level of detail available from the source information, for in-depth review. The digital images may include graphic images, maps, photographic images, or text documents, and the source information may be in raster, vector, or text form.

For example, in order to view a selected object or area in detail, a user can define a lens 410 over the object using the GUI 400. The lens 410 may be introduced to the original image to form the a presentation through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the object or area. Using the magnify lens control element, for example, the user may magnify the focal region 420 of the lens 410 to pixel quality resolution revealing detailed information pertaining to the selected object or area. That is, a base image (i.e., the image outside the extent of the lens) is displayed at a low resolution while a lens image (i.e., the image within the extent of the lens) is displayed at a resolution based on a user selected magnification 440, 441.

In operation, the data processing system 300 employs EPS techniques with an input device 310 and GUI 400 for selecting objects or areas for detailed display to a user on a display screen 340. Data representing an original image or representation is received by the CPU 320 of the data processing system 300. Using EPS techniques, the CPU 320 processes the data in accordance with instructions received from the user via an input device 310 and GUI 400 to produce a detail-in-context presentation. The presentation is presented to the user on a display screen 340. It will be understood that the CPU 320 may apply a transformation to the shoulder region 430 surrounding the region-of-interest 420 to affect blending or folding in accordance with EPS technology. For example, the transformation may map the region-of-interest 420 and/or shoulder region 430 to a predefined lens surface, defined by a transformation or distortion function and having a variety of shapes, using EPS techniques. Or, the lens 410 may be simply coextensive with the region-of-interest 420.

The lens control elements of the GUI 400 are adjusted by the user via an input device 310 to control the characteristics of the lens 410 in the detail-in-context presentation. Using an input device 310 such as a mouse, a user adjusts parameters of the lens 410 using icons and scroll bars of the GUI 400 that are displayed over the lens 410 on the display screen 340. The user may also adjust parameters of the image of the full scene. Signals representing input device 310 movements and selections are transmitted to the CPU 320 of the data processing system 300 where they are translated into instructions for lens control.

Moreover, the lens 410 may be added to the presentation before or after the object or area is selected. That is, the user may first add a lens 410 to a presentation or the user may move a pre-existing lens into place over the selected object or area. The lens 410 may be introduced to the original image to form the presentation through the use of a pull-down menu selection, tool bar icon, etc.

Advantageously, by using a detail-in-context lens 410 to select an object or area for detailed information gathering, a user can view a large area (i.e., outside the extent of the lens 410) while focusing in on a smaller area (or within the focal region 420 of the lens 410) surrounding the selected object. This makes it possible for a user to accurately gather detailed information without losing visibility or context of the portion of the original image surrounding the selected object.

Now, according to the present invention, improved methods are provided for occlusion reduction and magnification for multidimensional data presentations.

In 3D computer graphics and 3D information presentations generally, occlusion of objects of interest by other objects in the viewer's line of sight is a common problem. U.S. Pat. No. 6,798,412, which is incorporated herein by reference, describes methods of occlusion reduction based on displacements orthogonal to the line of sight and based on a variety of distance metrics and shaping functions. The present invention provides additional methods and improvements to methods for occlusion reduction. Furthermore, a lens definition that combines occlusion reduction and magnification is provided.

Figure 5:
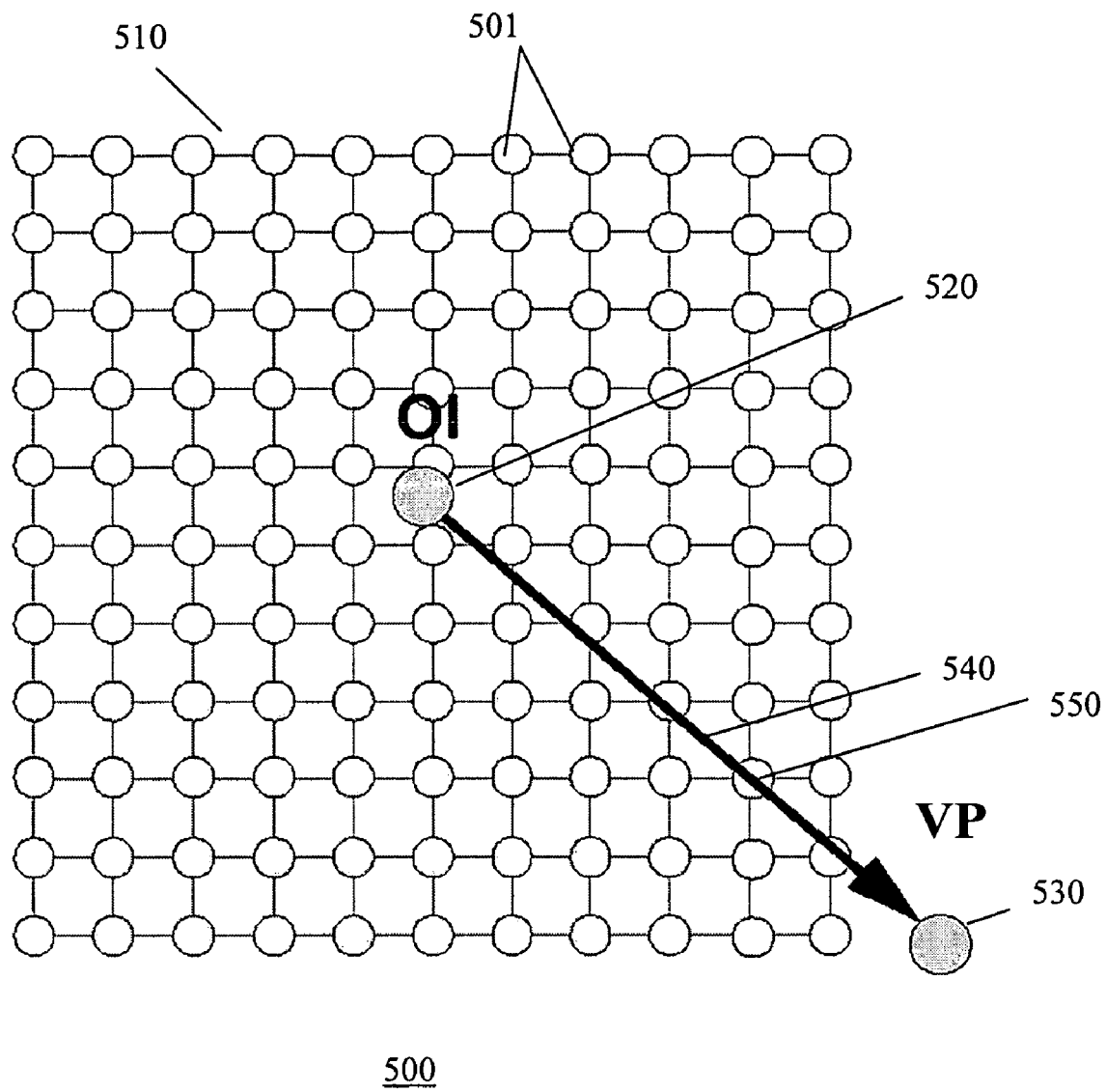
FIG. 5 is a diagram illustrating an original configuration of a 2D cross-sectional view of a structure.
Figure 6:
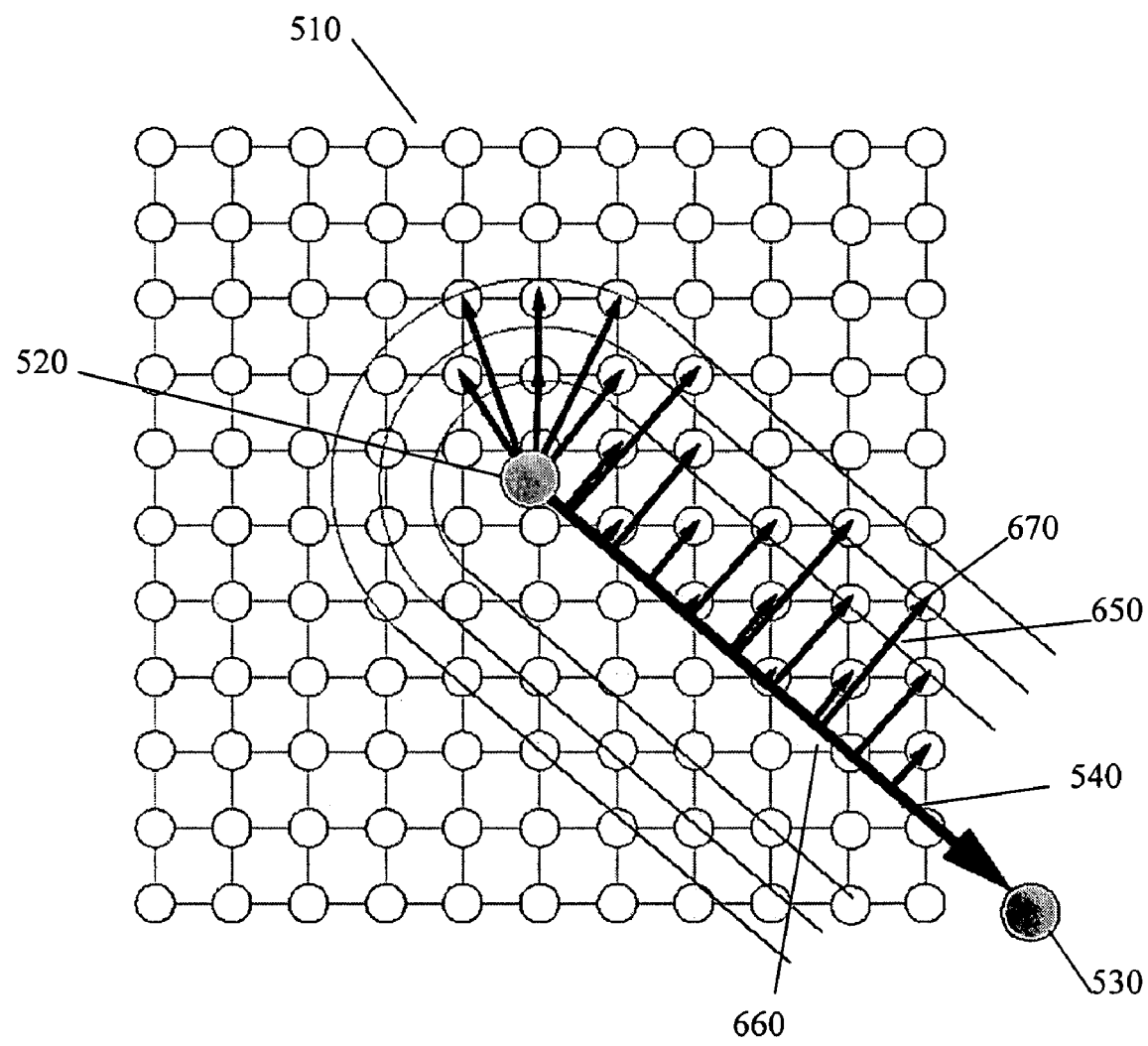
FIG. 6 is a diagram illustrating direction vectors to points in the structure of FIG. 5 lying on or near a sight-line.
Figure 7:
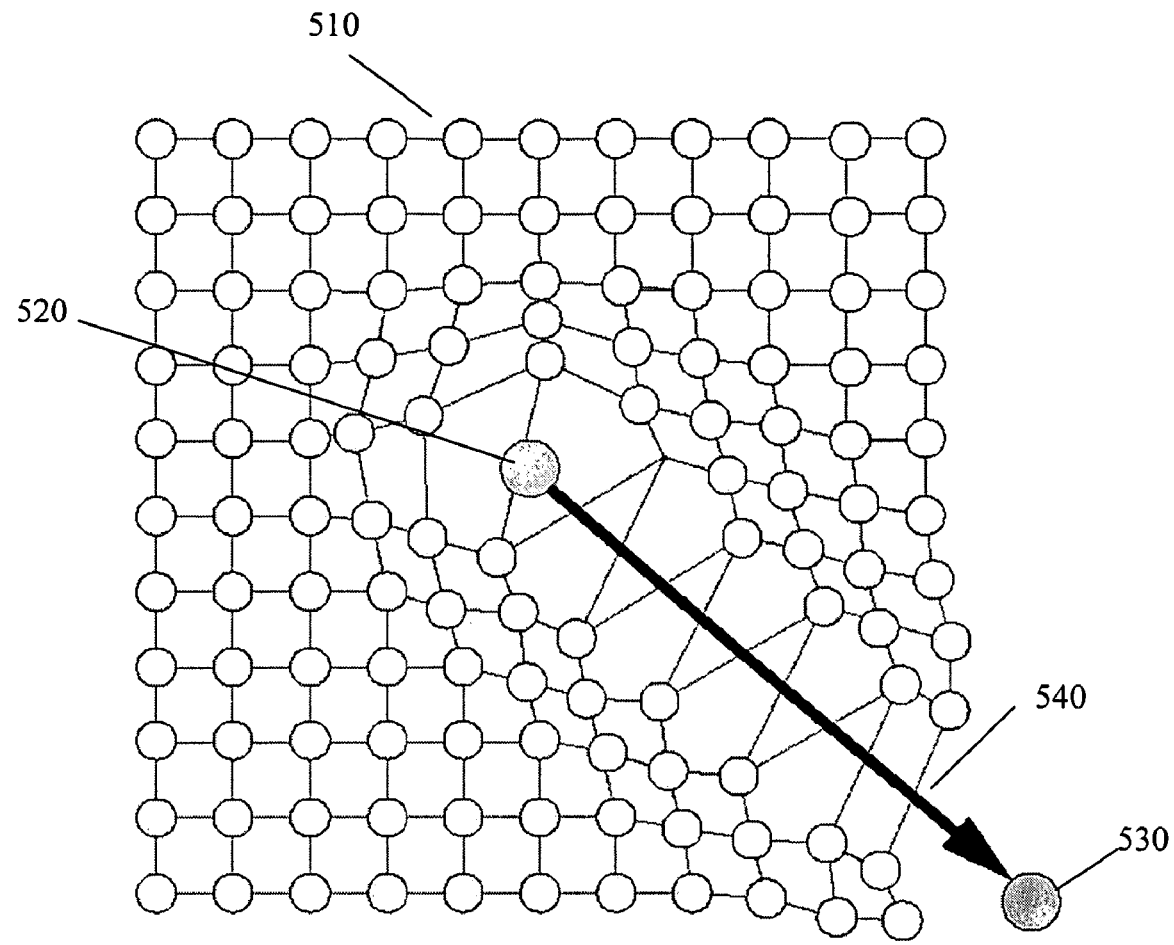
FIG. 7 is a diagram illustrating a final configuration resulting from the application of an occlusion reducing transformation function to the structure of FIG. 5.

For reference, FIGS. 5-7 show 2D cross-sectional views of a linear occlusion reducing transformation in operation. FIG. 5 is a diagram illustrating an original configuration 500 of the 2D cross-sectional view of a structure 510. The structure 510 is defined by a number of information points 501 arranged in a matrix. A region-of-interest (or an object-of-interest) 520 is shown near the centre of the structure 510. A viewpoint 530 for the region-of-interest 520 is shown near the bottom right-hand side of the structure 510. A sight-line 540 connects the region-of-interest 520 to the viewpoint 530. In other words, the region-of-interest 520 and the viewpoint 530 define the line of sight through the structure 510.

Figure 5A:
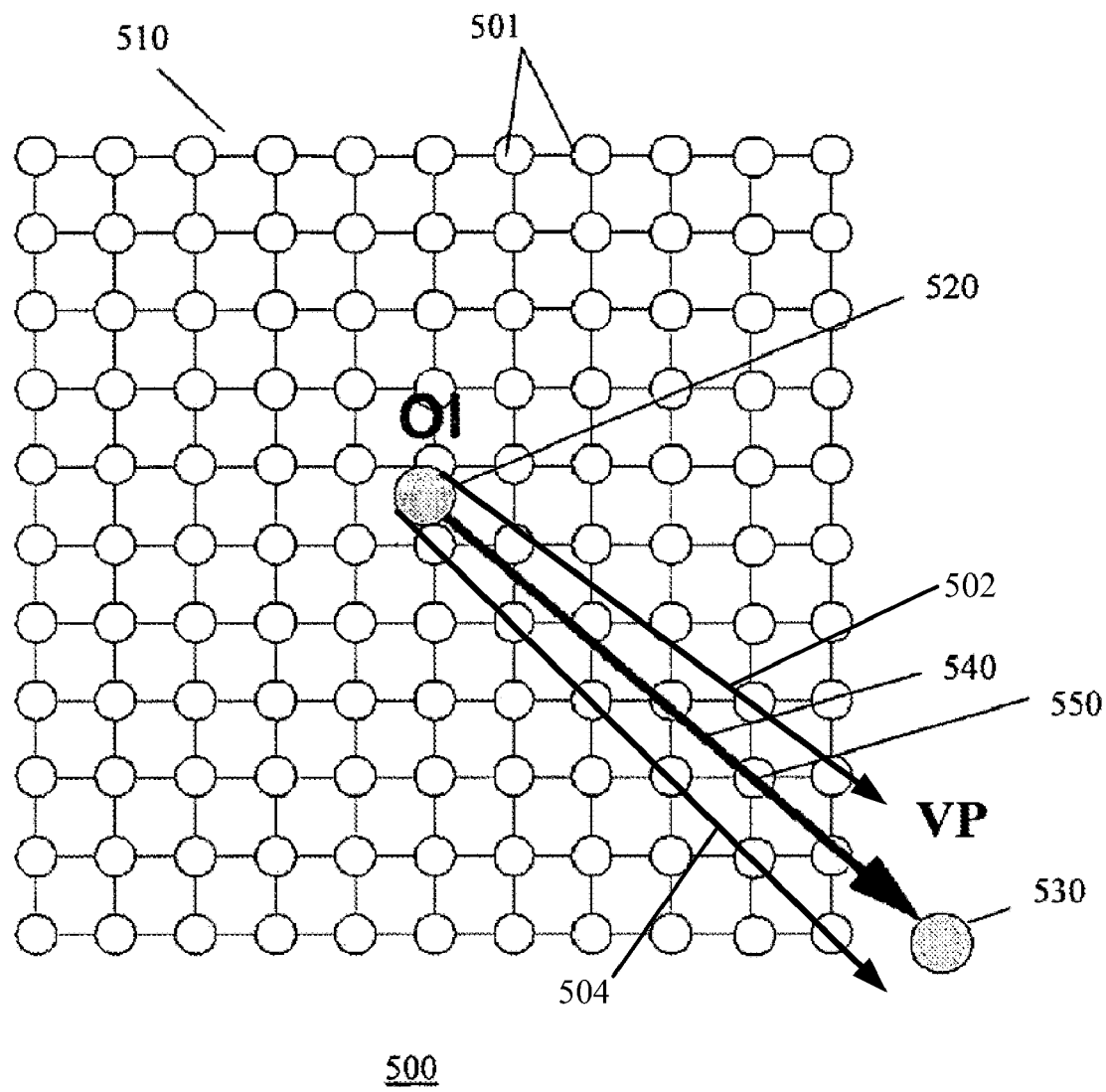
FIG. 5A is a diagram illustrating extrusion of points on the surface of the object-of-interest along a path toward a viewpoint.

FIG. 5A is a diagram illustrating extrusion of points on the object-of-interest (illustrated as lines 502, 504 extending from the object-of-interest 520) along the path, such as the sight-line 540, toward the viewpoint 530. The extrusions, represented as lines 502, 504, form a volume that may be used to determine minimum displacements from the path for objects intersected by the volume. By extruding the points on the object-of-interest 520, objects that occlude the object-of-interest may be displaced away from the path. For example, the points 501 intersected by the lines 502, 504 or lying within the volume formed by lines 502, 504 may be displaced away from the sight-line 540 according to a transformation function and the minimum displacements to locations within the original image, such as shown in FIG. 6.

FIG. 6 is a diagram illustrating direction vectors 650 to points 670 in the structure 510 of FIG. 5 lying on or near the sight-line 540. The distance of each point 670 is measured to the nearest point 660 on the sight-line 540. A direction vector 650 from the nearest point 660 on the sight-line 540 to the point being adjusted 670 is also determined. When the occlusion reducing transformation is applied, points will be moved in the direction of these direction vectors 650. The lengths of the direction vectors 650 form an input to a transformation function. The result of this function is used to determine the displacement for each point. Points closest to the line of sight are moved the furthest in distance, and points originally lying further away are moved in successively smaller increments in distance. In other words, the lengths of the direction vectors 650 form inputs to the function that determines the magnitude of resulting displacement vectors. The direction of the resulting displacement vectors will be parallel to the input direction vectors. Eventually a smooth transition is made to points which are far enough away as to be unaffected by the transformation.

FIG. 7 is a diagram illustrating a final configuration 700 resulting from the application of the occlusion reducing transformation function to the structure 510 of FIG. 5. In this final configuration 700, a clear line of sight from the viewpoint 530 to the region-of-interest 520 is established. Thus, the effect of an occlusion reducing transformation is to provide a clear line of sight, or visual access, to an object or region-of-interest within a 3D visual representation by adjusting the layout.

It is helpful to know the magnitude of the displacements required to clear the line of sight 540 to the object of interest 520 for the methods described in U.S. Pat. No. 6,798,412. According to one embodiment of the invention, the amplitude of displacements is increased until an extrusion of the object of interest 520 toward the viewpoint 530 does not intersect any other objects (e.g., 550 in FIG. 5). This extrusion test can be performed, for example, by projecting any point or locus of points on the object 520 in a direction towards the viewpoint 530. If this projection yields no intersections with other objects 550, then the line of sight 540 can be considered to be cleared, and the minimum magnitude of the occlusion reduction displacements has been achieved. This criterion provides a means of testing whether a given displacement operation or other occlusion reduction method has resulted in the elimination or reduction of occlusion. The extrusion of all object points in this manner defines a volume which must be cleared of obstructions for the complete elimination or reduction of occlusion. Advantageously, such an extrusion coupled with the orthogonal displacement as described above from U.S. Pat. No. 6,798,412 defines a minimum displacement from the line of sight 540 and hence an optimal occlusion reduction.

Figure 8:
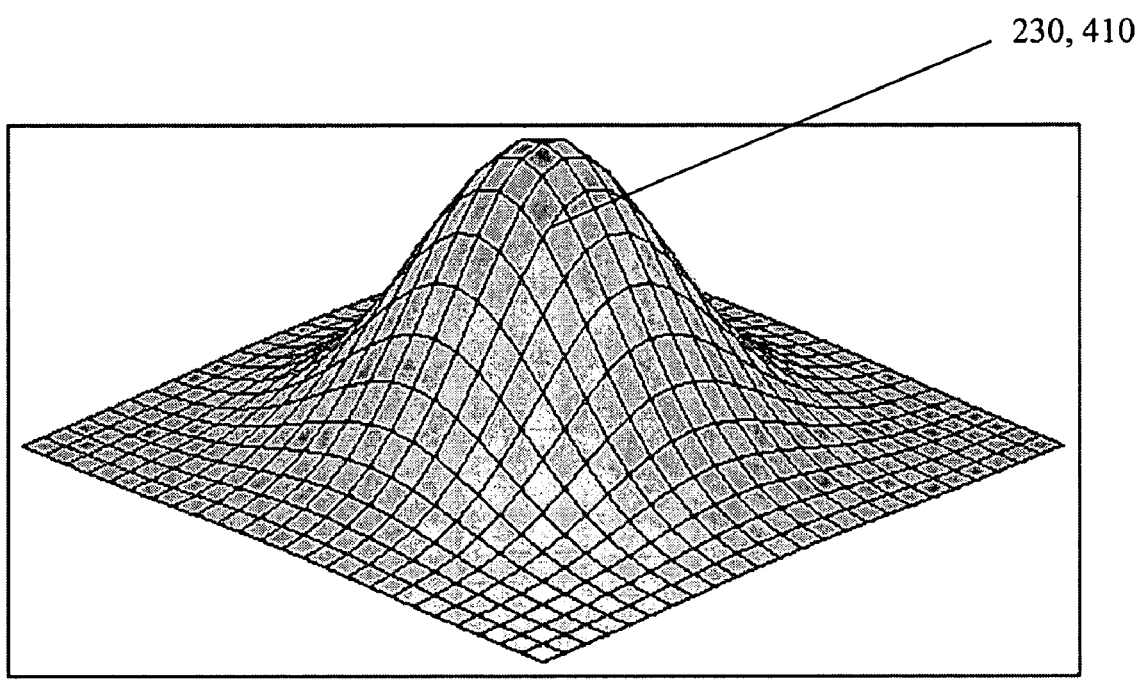
FIG. 8 is a diagram illustrating a distortion function or lens.
Figure 9:
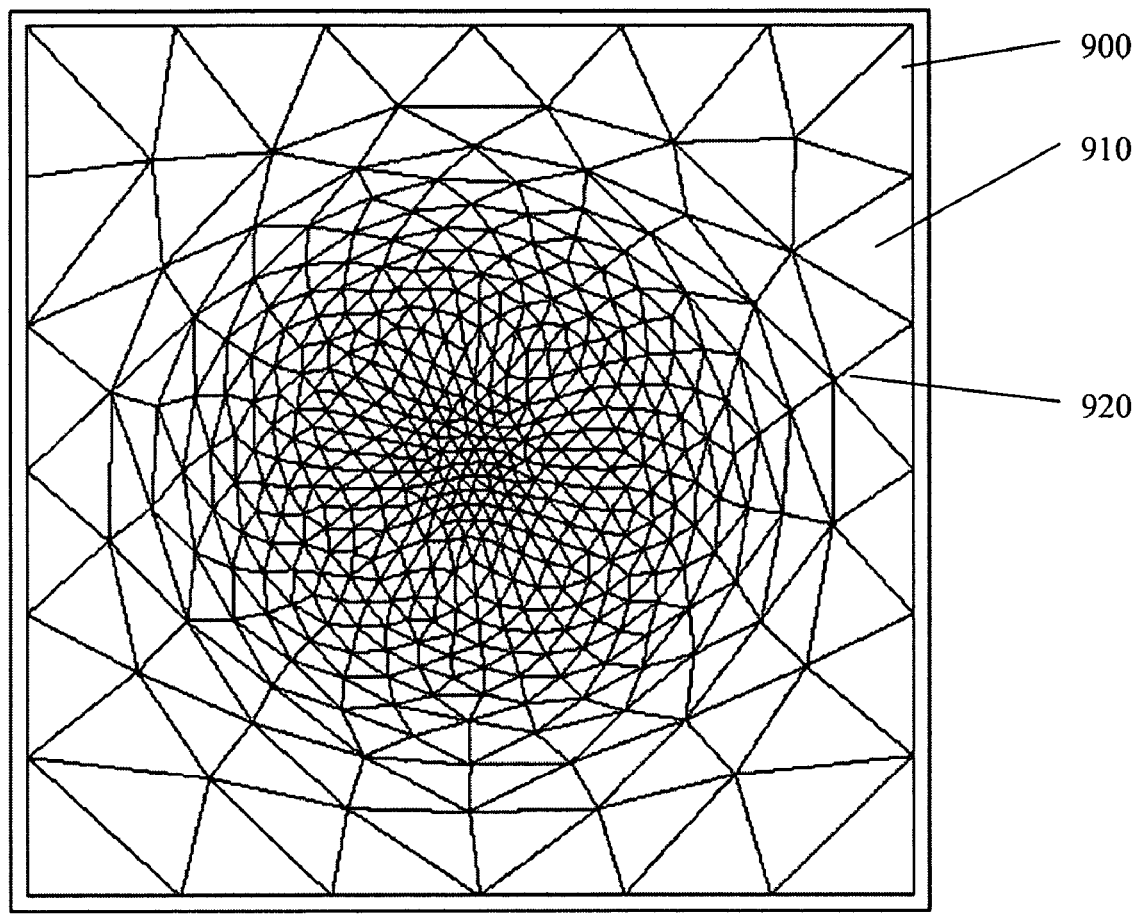
FIG. 9 is a diagram illustrating an original image or representation in the form of a mesh composed of polygons (e.g., triangles)
Figure 10:
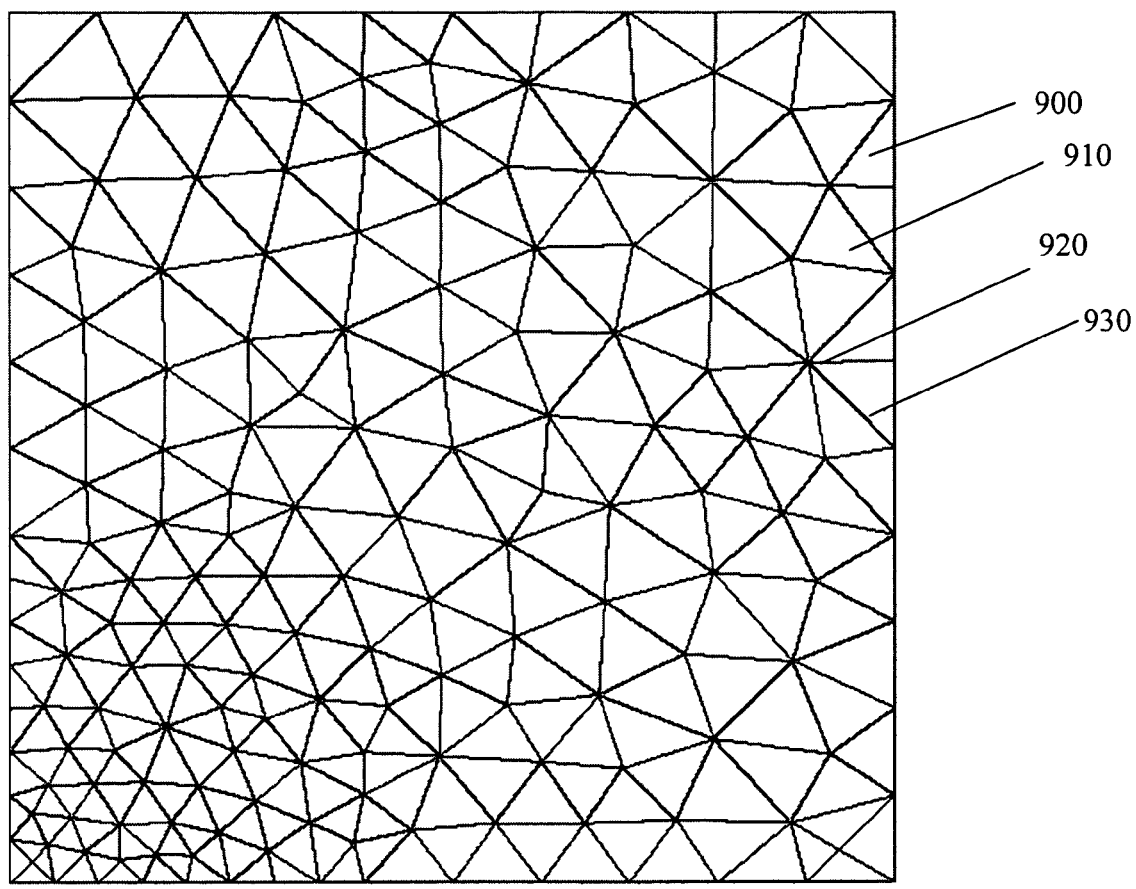
FIG. 10 is a detail view of a portion of the mesh of FIG. 9.

According to another embodiment of the invention, a method for the subdivision of polygons to improve displacement quality is provided. For reference, FIG. 8 is a diagram illustrating a distortion function 230 or lens 410. In operation, the lens 410 may be adjusted with the GUI 400 of FIG. 4. FIG. 9 is a diagram illustrating an original image or representation in the form of a mesh 900 composed of polygons (e.g., triangles) 910. And, FIG. 10 is a detail view of a portion of the mesh 900 of FIG. 9. In FIG. 8, the lens 410 is defined by a distortion function 230 that is a Gaussian function. The mesh 900 of FIG. 9 is fitted to the distortion function 230 or lens 410 of FIG. 8 in that the mesh 900 is aligned to the Hessian of the Gaussian function (i.e., the polygons near the centre of the mesh 900 are smaller in size than those near the outer edges of the mesh). Of course, the mesh 900 may have polygons 910 that are not pre-fitted to the lens 410. In any event, with such a mesh 900 defined, the application of a lens 410 to an original image may be simplified as in general only the vertices 920 of each polygon 910 need be displaced. Points lying between the vertices 920 may then be interpolated. The method described here with respect to FIGS. 8-10 is one approach of generating a random looking mesh in the hope that it will closely approximate a lens. What will be described next is an improved methodical approach to meshing a polygon.

When dealing with 3D polygonal (e.g., triangle 910 shown in 2D in FIG. 9) data, displacing existing vertices 920 is often not enough to produce a good quality lensed scene. For example, a problem arises when individual triangles 910 are large in relation to the lens 230, 410. In these cases it is possible for the triangles 910 to overlap the lens 410, but have no vertices 920 in the lens 410, under which circumstance none of the vertices 920 would be displaced. This can result in a non-ideal situation where a triangle 910 is not displaced even though it intersects the lens 410. As another example, it is possible for one or multiple vertices 920 to lie within the lens 410, under which circumstance those vertices 920 would be displaced, but the connecting edges 930 would remain straight, not curved according to the geometry specified by the lens 410. The solution to these problems provided by the present invention is to subdivide triangles 910 that intersect the lens 410 in such a way that the displaced triangles will adequately approximate the distortion specified by the lens 410. This is accomplished by inserting extra vertices 920 and edges 930 into the triangle geometry 900. In the case of a circular lens 410 with a circular focal region 420, for example, a circle of edges 930 around the bounds or perimeter (e.g., 411 or 412) of the lens 410, one around the focal bounds or perimeter (e.g., 421) of the lens 410, and possibly one or more at intermediate points (e.g., 430) in between the focal region 420 and the bounds 411, 412 is inserted. According to another embodiment, additional edges 930 and vertices 920 may be inserted radially from the center of the lens 410, like bicycle spokes, to improve the appearance of the lens 410.

Note that the notion of a "mesh", while appropriate for 2D applications, is not entirely appropriate for 3D applications. For 3D applications, the expression a "collection of polygons" is more appropriate as in general 3D data is considered to be a collection of isolated triangles (polygons). In the method described above, what is accomplished is the meshing of a polygon 910, or a subdividing of a polygon into many polygons. Thus, for 3D applications, FIGS. 9 and 10 may be described as illustrating a "collection of polygons" 900 rather than a mesh composed of polygons. For example, in the case of a CAD drawing with multiple parts, there could be a separate mesh or collection of polygons associated with each part.

Another difference between 2D and 3D applications is that in 3D applications, data vertices 920 can be located anywhere in the 3D space. This affects the manner in which a detail-in-context presentation for an original 3D image is generated. In particular, with respect to lens definition, in 2D, the lens (e.g., 230 in FIG. 2) is defined as existing in the plane 210 of the original image or data. However, in 3D, there is no inherent data plane 210. Therefore, an arbitrary plane is chosen on which the lens 410 may be defined. The arbitrary plane can be chosen to be orthogonal to the line of sight (e.g., 231 in FIG. 2). The lens can be defined on the arbitrary plane and then projected onto a view plane (e.g., 201 in FIG. 2) or screen to achieve a desired size or magnification.

Now, to subdivide the triangles or polygons 910 to adequately approximate the distortion specified by the lens 410, a first step is project the perimeter of the lens 411, 412 and/or focal region 421 onto the arbitrary plane. This projection may be a perspective projection or an orthonormal projection. After the subdivision of polygons 910, the resulting collection of polygons are displaced onto the lens 410 and perspectively projected onto a view plane in a viewpoint aligned direction.

Note that occlusion reduction can also be performed with an orthonormal camera projection. In an orthonormal projection, first, an arbitrary perspective projection is used with a standard displacement function (as described above), second, the point to be displaced is translated onto the lens surface, and third, the point is perspectively projected onto the desired plane. The difference between this new point and the original point is what is used for the displacement in an orthonormal projection.

According to another embodiment of the invention, a method for providing a lens-dependent level of detail in a presentation is provided. Now, 3D models can sometimes be very complex, taxing the processor 320 and memory 330 subsystems of a data processing system 300. Reducing model complexity can help deal with this problem. Coupling level of detail with lens position can be used to keep polygon count in a mesh 900 low, while still providing high polygon counts where they are needed. The low level polygon count models can be arrived at in several ways. First, a user can explicitly specify a simple geometry version of a complex assembly. For example, the rendering software 331 may be instructed to replace a complex engine assembly in a representation of an automobile with a simple cylinder assembly. Second, the rendering software 331 can use automated model simplification algorithms to arrive at simpler models, provided that these algorithms themselves are not excessively computationally expensive.

According to another embodiment of the invention, 3D magnification lenses and a method for occlusion reduction with magnification are provided. In this embodiment, detail-in-context lens magnification, as described in U.S. Pat. Nos. 6,768,497 and 6,798,412 and U.S. patent application Ser. Nos. 10/021,313, 10/137,648, and 10/166,736, which are incorporated herein by reference, is extended to magnification of 3D objects. Algorithmically, there are several methods of providing this. One method is to project 3D data vertices onto a plane perpendicular to the line of sight, apply a 2D lens to the vertices (e.g., 920) in the plane, and then "un-project" the vertices back into 3D. An occlusion reduction operation for the magnified object can then be applied after the magnification step (i.e., the application of the 2D lens). The un-project step may be performed in two ways. The first method is to translate the lensed point along a line specified by the viewpoint and the lensed point, a distance equal to the distance of the original projection. The direction of translation is opposite to the original projection. The second method is the same as the first, except the distance of the translation is calculated such that the point will be co-planar with the original data vertex point, with the plane defined as being perpendicular to the line of sight.

According to another embodiment of the invention, a method for selective and automatic occlusion reduction based on object recognition or object attributes is provided. In many cases it is desirable to preserve the location of specific occluding objects, to prevent the separation of related or grouped objects, or to limit the allowed displacement of specific objects. According to this embodiment of the invention, pattern recognition or object recognition methods are used to automatically detect specific objects (e.g., 550 in FIG. 5) and apply known constraints to their allowed displacements. For example, an object of interest may be recognized by querying a database or table of object features of a given assembly with a query containing identifying parameter values of the object-of-interest. Alternately, raster pattern matching algorithms may be applied to compare a digital photograph of the part of interest with the actual rendered objects of the assembly to identify a matching part. According to another embodiment of the invention, maximum displacements and related attributes are stored with the objects and retrieved during the occlusion reduction operations to constrain object displacements.

Figure 11:
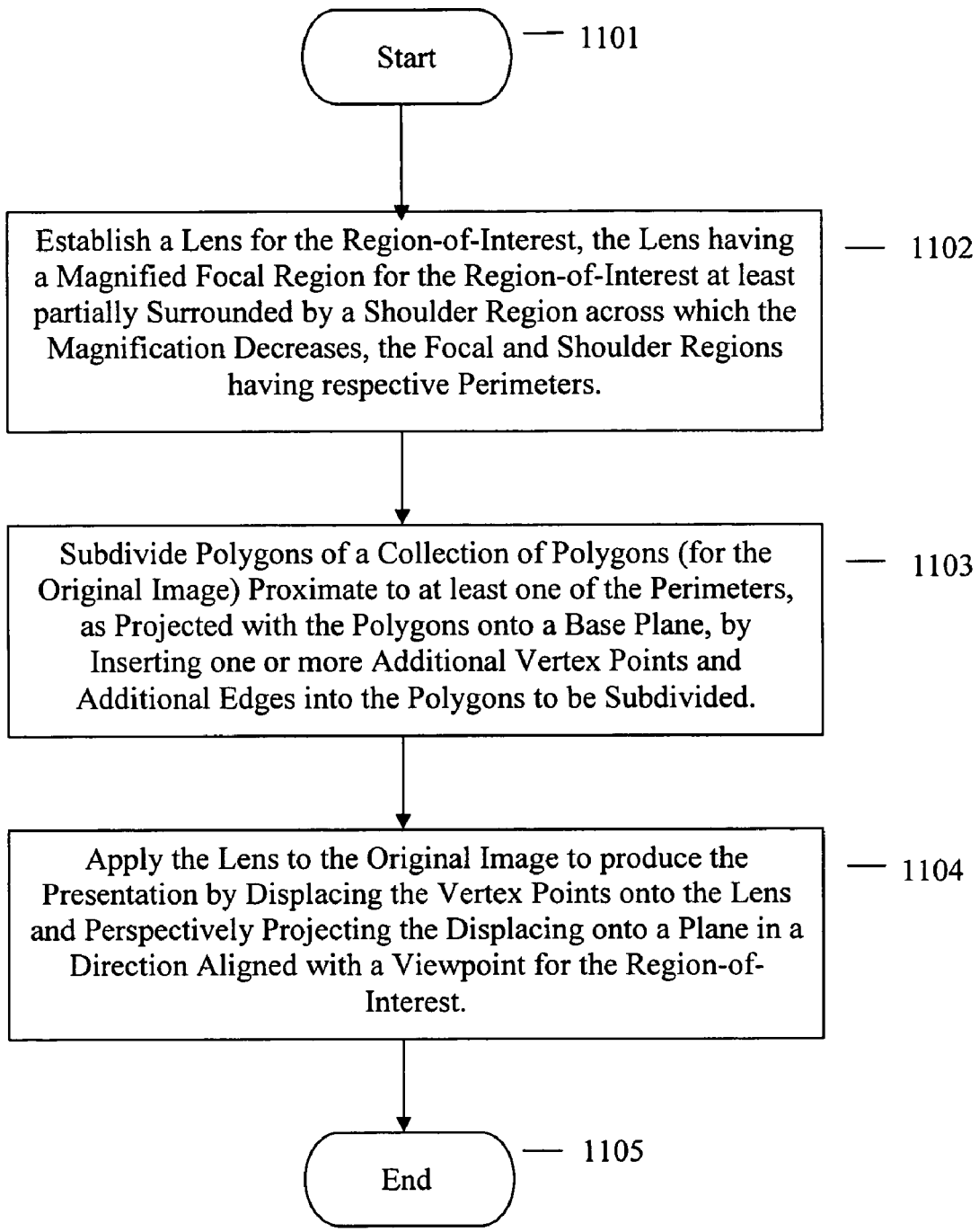
FIG. 11 is a flow chart illustrating operations of software modules within the memory of a data processing system for generating a presentation of a region-of-interest in an original image for display on a display screen, the original image being a collection of polygons having polygons defined by three or more shared edges joined at vertex points, in accordance with an embodiment of the invention.

The above described method (i.e., with respect to polygon subdivision) may be summarized with the aid of a flowchart. FIG. 11 is a flow chart illustrating operations 1100 of software modules 331 within the memory 330 of a data processing system 300 for generating a presentation of a region-of-interest in an original image for display on a display screen 340, the original image being a collection of polygons 900 having polygons 910 defined by three or more shared edges 930 joined at vertex points 920, in accordance with an embodiment of the invention.

At step 1101, the operations 1100 start.

At step 1102, a lens 230, 410 is established for the region-of-interest, the lens 230, 410 having a magnified focal region 233, 420 for the region-of-interest at least partially surrounded by a shoulder region 234, 430 across which the magnification decreases, the focal and shoulder regions having respective perimeters 421, 412.

At step 1103, polygons 910 of the collection of polygons 900 proximate to at least one of the perimeters 421, 412, as projected with the polygons 910 onto a base plane 210, are subdivided by inserting one or more additional vertex points 920 and additional edges 930 into the polygons 910 to be subdivided.

At step 1104, the lens 230, 410 is applied to the original image to produce the presentation by displacing the vertex points 920 onto the lens 230, 410 and perspectively projecting the displacing onto a view plane 201 in a direction 231 aligned with a viewpoint 240 for the region-of-interest.

At step 1105, the operations 1100 end.

Preferably, the method further includes positioning the one or more additional vertex points and additional edges to align with the at least one of the perimeters 421, 411, 412. Preferably, the focal region 420 has a size and a shape and the method further includes receiving one or more signals to adjust at least one of the size, shape, and magnification of the focal region 420. Preferably, the method further includes displaying the presentation on the display screen 340. Preferably, the lens is a surface. Preferably, the method further includes receiving the one or more signals through a graphical user interface ("GUI") 400 displayed over the lens 410. Preferably, the GUI 400 has means for adjusting at least one of the size, shape, and magnification of the focal region 420. Preferably, at least some of the means are icons. Preferably, the means for adjusting the size and shape is at least one handle icon 481, 482 positioned on the perimeter 421 of the focal region 420. Preferably, the means for adjusting the magnification is a slide bar icon 440, 441. Preferably, the method further includes receiving the one or more signals from a pointing device 310 manipulated by a user. Preferably, the pointing device 310 is at least one of a mouse, a trackball, and a keyboard. Preferably, the shoulder region 430 has a size and a shape and further comprising receiving one or more signals through a GUI 400 displayed over the lens 410 to adjust at least one of the size and shape of the shoulder region 430, wherein the GUI 400 has one or more handle icons 491 positioned on the perimeter 411, 412 of the shoulder region 430 for adjusting at least one of the size and the shape of the shoulder region 430. Preferably, the method further includes selecting the base plane 210. Preferably, the polygons 910 are orthonormally projected onto the base plane 210. Preferably, the polygons 910 are perspectively projected onto the base plane 210. Preferably, the original image is a three-dimensional original image. Preferably, the method further includes positioning the one or more additional vertex points 920 and additional edges 930 to align with radii of the lens 410.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 3 can be contained in a data carrier product according to one embodiment of the invention. This data carrier product can be loaded into and run by the data processing system 300 of FIG. 3. In addition, the sequences of instructions which when executed cause the method described herein to be performed by the data processing system 300 of FIG. 3 can be contained in a computer software product according to one embodiment of the invention. This computer software product can be loaded into and run by the data processing system 300 of FIG. 3. Moreover, the sequences of instructions which when executed cause the method described herein to be performed by the data processing system 300 of FIG. 3 can be contained in an integrated circuit product including a coprocessor or memory according to one embodiment of the invention. This integrated circuit product can be installed in the data processing system 300 of FIG. 3.

The embodiments of the invention described above are intended to be exemplary only. The scope of the invention is therefore intended to be limited solely by the scope of the appended claims.

What is claimed is:

1. A method comprising:
    establishing a viewpoint for an object-of-interest included in an image;
    establishing a path between the viewpoint and the object-of-interest;
    extruding surface points included on the object-of-interest along the path toward the viewpoint to define a volume, with a computer system that includes one or more processors, that determines a minimum displacement from the path for an object that is intersected by the volume and at least partially occludes the object-of-interest relative to the viewpoint;
    displacing the object that is intersected by the volume away from the path based on a transformation function and the minimum displacement, with the computer system, to a location within the image so the object intersected by the volume remains visible and does not occlude the object-of-interest relative to the viewpoint in a presentation; and
    displaying the presentation on a display device of the computer system.

2. The method of claim 1, wherein the displacing further comprises displacing the object intersected by the volume so other objects within the image are not occluded by the object intersected by the volume after displacement.

3. The method of claim 1, wherein the displacing is performed so the object-of-interest is not occluded in the presentation.

4. The method of claim 1, wherein the surface points comprise vertex points for one or more polygons forming the object-of-interest.

5. The method of claim 1, wherein the path extends through the image.

6. The method of claim 1, further comprising:
    testing whether the object intersected by the volume occludes the object-of-interest; and
    increasing the minimum displacement amplitude so an extrusion of the object-of-interest is not occluded by the object intersected by the volume.

7. The method of claim 1, further comprising applying a constraint to the object to limit the displacing the object intersected by the volume away from the path.

8. A system comprising:
    a computer system, including one or more processors, that is configured to execute instructions that, responsive to being executed by the computer system, cause the computer system to provide:
        a module to extrude surface points on an object-of-interest toward a viewpoint to define a volume for determining minimum displacements from a path, between the viewpoint and the object-of-interest, for objects intersected by the volume, the object-of-interest and the objects intersected by the volume being included in an image in which the objects intersected by the volume at least partially occlude the object-of-interest relative to the viewpoint; and
        a module to displace the objects intersected by the volume away from the path according to a transformation function and the minimum displacements to locations within the image where the objects that are displaced remain visible and do not occlude the object-of-interest relative to the viewpoint in a presentation.

9. The system of claim 8, wherein at least a portion of the objects intersected by the volume remain at least partially visible relative to the viewpoint in the presentation.

10. The system of claim 8, wherein the object-of-interest is not occluded relative to the viewpoint in the presentation.

11. The system of claim 8, wherein the surface points are vertices of polygons that comprise the object-of-interest.

12. The system of claim 8, wherein the path extends through the image.

13. The system of claim 12, wherein the image comprises a computer generated image.

14. The system of claim 12, wherein the image comprises a three dimensional image.

15. A system as described in claim 12, wherein the module to displace is further configured to displace the objects intersected by the volume so additional objects within the image are not blocked by displacement of the objects intersected by the volume.

16. An apparatus comprising:
a computer system including one or more processors coupled to memory that includes a program of instructions that, responsive to being executed by the computer system, cause the computer system to:
define a volume from surface points on an object-of-interest extruded to a viewpoint, in which the volume determines a minimum displacement for an object intersected by the volume from a path that extends between the viewpoint and the object-of-interest, the object-of-interest and the object intersected by the volume being in an image in which the object intersected by the volume at least partially occludes the object-of-interest relative to the viewpoint; and
generate a presentation for display that has the object intersected by the volume displaced away from the path based on a transformation function and the minimum displacement so the object intersected by the volume and the object-of-interest are visible from the viewpoint in the presentation.

17. The apparatus of claim 16, wherein the object-of-interest is not occluded relative to the viewpoint in the presentation.

18. The apparatus of claim 16, wherein the path extends through the image.

19. The apparatus of claim 16, wherein displacement of the object intersected by the volume does not occlude other objects in the image.

20. The apparatus of claim 16, wherein the image comprises a computer generated image.

21. The apparatus of claim 20, wherein the computer generated image comprises a three dimensional image.

22. A method comprising:
extruding surface points included on an object-of-interest to a viewpoint, with a computer system including one or more processors, to define a volume that determines a minimum displacement from a path that is established between the object-of-interest and the viewpoint for an object that is intersected by the volume and occludes the object-of-interest relative to the viewpoint in an image; and
generating a presentation, with the computer system for display on a display device, that includes the object intersected by the volume displaced away from the path based on a transformation function and the minimum displacement so the object intersected by the volume remains visible and does not occlude the object-of-interest relative to the viewpoint.

23. The method of claim 22, wherein the object included in the volume does not occlude another object in the image relative to the viewpoint in the presentation.

24. The method of claim 22, wherein the image comprises a computer generated image.

25. The method of claim 24, wherein the computer generated image comprises a three dimensional image.

26. The method of claim 22, wherein the object included in the volume remains visible from the viewpoint in the presentation.

27. The method of claim 22, wherein the surface points are vertices of polygons that comprise the object-of-interest.

28. An article of manufacture including a computer-readable medium having instructions stored thereon that, responsive to being executed by a computer system including one or more processors, cause the computer system to perform operations comprising:
extruding surface points included on an object-of-interest in an image along a path to a viewpoint to form a volume;
displacing objects, that occlude the object of interest relative to the viewpoint, intersected by the volume in the image away from the path based on a transform function and minimum displacements determined from the volume; and
generating a presentation that includes the objects displaced away from the path so the object-of-interest is not occluded in the presentation and the objects are visible from the viewpoint without blocking additional objects, relative to the viewpoint, in the image that are not displaced.

29. The article of manufacture of claim 28, wherein the surface points comprise vertex points for one or more polygons that form the object-of-interest.

30. The article of manufacture of claim 28, wherein the image comprises a computer generated multidimensional image.

* * * * *

UNITED STATES PATENT AND TRADEMARK OFFICE
CERTIFICATE OF CORRECTION

PATENT NO. : 7,714,859 B2 Page 1 of 1
APPLICATION NO. : 11/214886
DATED : May 11, 2010
INVENTOR(S) : Garth B. D. Shoemaker, David J. P. Baar and Ali Solehdin It is certified that error appears in the above-identified patent and that said Letters Patent is hereby corrected as shown below:

On the Title Page Item (56) On page 4, in the first column, line 62, delete "98/2776," and insert -- 98-2776, --, therefor.
On the Title Page Item (56) On page 4, in the second column, line 17, after "Interface" insert -- Software and --.
On the Title Page Item (56) On page 4, in the second column, line 62, delete "handed" and insert -- hand --, therefor.
On the Title Page Item (56) On page 4, in the second column, line 69, delete "Delauney" and insert -- Delaunay --, therefor.
On the Title Page Item (56) On page 5, in the first column, line 16, delete "an" and insert -- and --, therefor.
In column 1, line 5, below "PRESENTATIONS" insert -- RELATED APPLICATION DATA" --.
In column 13, line 55, after "form" delete "the".

Signed and Sealed this

Twenty-first Day of September, 2010

David J. Kappos
*Director of the United States Patent and Trademark Office*